US008392389B2

(12) United States Patent
Ono et al.

(10) Patent No.: US 8,392,389 B2
(45) Date of Patent: Mar. 5, 2013

(54) COMBINED LOCATION AND FREQUENCY INFORMATION PROCESSING APPARATUS, METHOD, AND PROGRAM

(75) Inventors: Kenichi Ono, Tokyo (JP); Tomohiro Tsuyuhara, Kanagawa (JP); Toru Konishi, Kanagawa (JP); Manabu Yasumi, Tokyo (JP)

(73) Assignee: Sony Corporation, Tokyo (JP)

( * ) Notice: Subject to any disclaimer, the term of this patent is extended or adjusted under 35 U.S.C. 154(b) by 494 days.

(21) Appl. No.: 12/621,920

(22) Filed: Nov. 19, 2009

(65) Prior Publication Data
US 2010/0169004 A1 Jul. 1, 2010

(30) Foreign Application Priority Data

Dec. 26, 2008 (JP) ................................. 2008-335253

(51) Int. Cl.
*G06F 7/00* (2006.01)
*G06F 17/30* (2006.01)
(52) U.S. Cl. ....................................................... 707/705
(58) Field of Classification Search .................... None
See application file for complete search history.

(56) References Cited

U.S. PATENT DOCUMENTS

| 6,232,915 | B1* | 5/2001 | Dean et al. ............... 342/357.31 |
| 6,484,094 | B1 | 11/2002 | Wako |
| 6,636,249 | B1 | 10/2003 | Rekimoto |
| 2002/0032699 | A1* | 3/2002 | Edwards et al. .............. 707/513 |
| 2006/0123014 | A1 | 6/2006 | Ng |
| 2007/0038960 | A1 | 2/2007 | Rekimoto |

FOREIGN PATENT DOCUMENTS

| EP | 1 003 018 A2 | 5/2000 |
| JP | 2006-23793 | 1/2006 |
| JP | 2006-31149 | 2/2006 |
| JP | 2006-65650 | 3/2006 |
| JP | 2006-92170 | 4/2006 |
| JP | 2006-171012 | 6/2006 |
| JP | 2007-003743 | 1/2007 |
| JP | 2007-135105 | 5/2007 |
| JP | 2008-275441 | 11/2008 |
| WO | WO 2006/032962 A1 | 3/2006 |

OTHER PUBLICATIONS

Search Report issued Jan. 12, 2011, in European patent Application No. 09180389.0-1236 / 2221580.

Office Action issued Jun. 14, 2011, in Japanese Patent Application No. 2008-335253.

(Continued)

*Primary Examiner* — Uyen T. Le
(74) *Attorney, Agent, or Firm* — Oblon, Spivak, McClelland, Maier & Neustadt, L.L.P.

(57) ABSTRACT

An information processing apparatus is provided which includes an acquired information storage unit capable of storing acquired information that associates one or a plurality of pieces of mutually different position information and an acquisition count of each of one or the plurality of pieces of position information, an acquisition unit that acquires the position information indicating a position of a local apparatus, an acquisition count measuring unit that, when the acquisition unit acquires the position information, adds a predetermined value to the acquisition count associated with the acquired position information, and a control unit that sorts the acquired information stored in the acquired information storage unit in descending order of the acquisition count.

18 Claims, 19 Drawing Sheets

OTHER PUBLICATIONS

Mitsuhiro Matsumoto, et al., "A prediction of user's operation based on Context Information about cellular phones", Knowledge-based system study group document, Japan, Corporate judicial person artificial intelligence society, (SIG-KBS-A702), Nov. 22, 2007, pp. 87-92, 3 additional pages.

Office Action issued Sep. 21, 2010, in Japanese Patent Application No. JP 2008-335253 with English language translation.

Office Action issued Jul. 3, 2012, in Japanese Patent Application No. 2008-335253 (with English-language Translation).

* cited by examiner

FIG.3

| ACQUISITION COUNT | LATITUDE | LONGITUDE |
|---|---|---|
| 138 | N1 | E1 |
| 132 | N2 | E2 |
| 61 | N3 | E3 |
| 56 | N4 | E4 |
| 24 | N5 | E5 |
| ⋮ | ⋮ | ⋮ |

FIG.5

| ACQUISITION COUNT | ADDRESS |
|---|---|
| 142 | 5-CHOME, C WARD, AB PREFECTURE |
| 113 | 1-CHOME, D WARD, AB PREFECTURE |
| 63 | 2-CHOME, G WARD, EF PREFECTURE |
| 31 | 3-CHOME, H WARD, EF PREFECTURE |
| 18 | 4-CHOME, C WARD, AB PREFECTURE |
| ⋮ | ⋮ |

FIG.7

| ACQUISITION COUNT | NEIGHBORING STATION NAME |
|---|---|
| 116 | A2 |
| 114 | B3 |
| 88 | B5 |
| 45 | A6 |
| 27 | C1 |
| ⋮ | ⋮ |

| INFORMATION CARRYING PAGE NAME | RESTAURANT INFORMATION |
|---|---|
| GASOLINE SERVICE STATION INFORMATION | D1 |
| GOLF COURSE INFORMATION | D2 |
| MAP INFORMATION | D3 |
| LUNCH INFORMATION | D4 |
| SIGHTSEEING INFORMATION | D5 |
| INFORMATION CARRYING PAGE ADDRESS | D6 |
| ⋮ | ⋮ |

FIG.12

| TIME ZONE CONDITIONS | INFORMATION CARRYING PAGE NAME | INFORMATION CARRYING PAGE ADDRESS |
|---|---|---|
| DAY OF WEEK=[FRI] AND TIME=[18:00-24:00] | HOLIDAY EVENT INFORMATION | D11 |
| DAY OF WEEK=[FRI] AND TIME=[11:00-20:00] | BAR INFORMATION | D12 |
| DAY=[24-26] | BARGAIN INFORMATION | D13 |
| MONTH=[9-11] | SCENIC SPOT INFORMATION OF AUTUMN LEAVES | D14 |
| MONTH=[3-4] | SCENIC SPOT INFORMATION OF CHERRY BLOSSOMS | D15 |
| NO CONDITION | FIREWORKS INFORMATION | D16 |
| ⋮ | ⋮ | ⋮ |

FIG.13

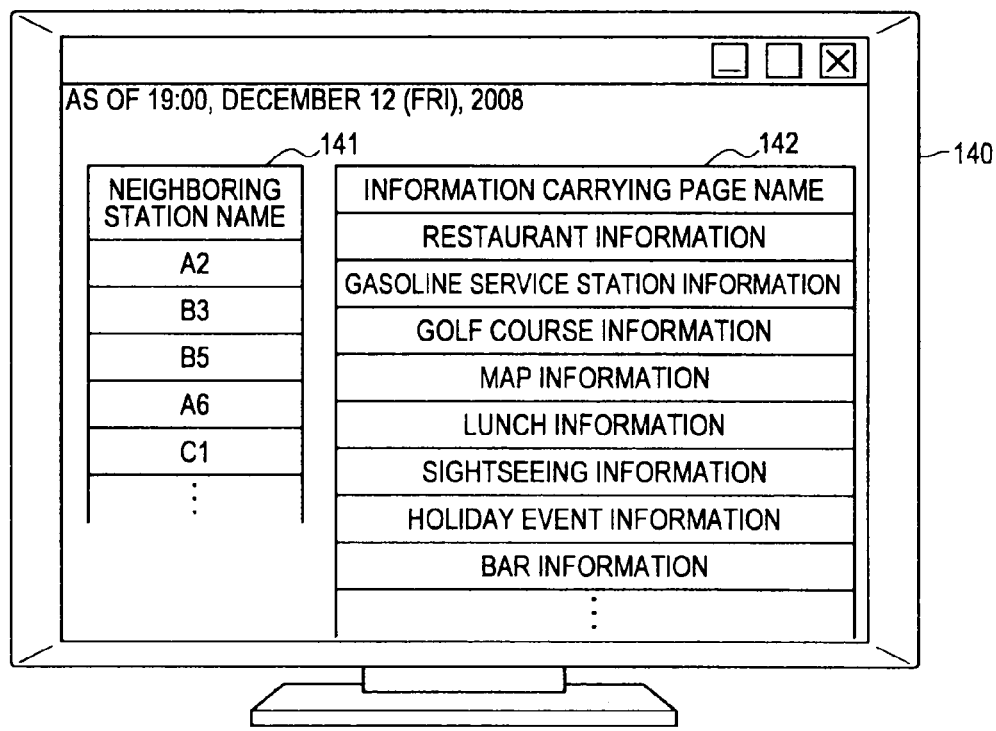

FIG.14

| ROUTE NAME | STATION NAME |
|---|---|
| A LINE | A1,A2,A3,A4,A5,A6 |
| B LINE | B1,B2,B3,B4,B5 |
| C LINE | C1,C2,C3 |
| ⋮ | ⋮ |

FIG.15

| ROUTE NAME | STATION NAME | | | | | | INFORMATION CARRYING PAGE |
|---|---|---|---|---|---|---|---|
| A LINE | A1 | A2 | A3 | A4 | A5 | A6 | RESTAURANT INFORMATION |
| B LINE | B1 | B2 | B3 | B4 | B5 | | GASOLINE SERVICE STATION INFORMATION |
| C LINE | C1 | C2 | C3 | | | | GOLF COURSE INFORMATION |
| | | | | | | | MAP INFORMATION |
| ⋮ | ⋮ | ⋮ | ⋮ | ⋮ | ⋮ | ⋮ | LUNCH INFORMATION |
| | | | | | | | SIGHTSEEING INFORMATION |
| | | | | | | | ⋮ |

| SEARCH KEYWORD | SEARCH COUNT |
|---|---|
| CHINESE NOODLES | 24 |
| PERSONAL COMPUTER | 18 |
| ⋮ | ⋮ |

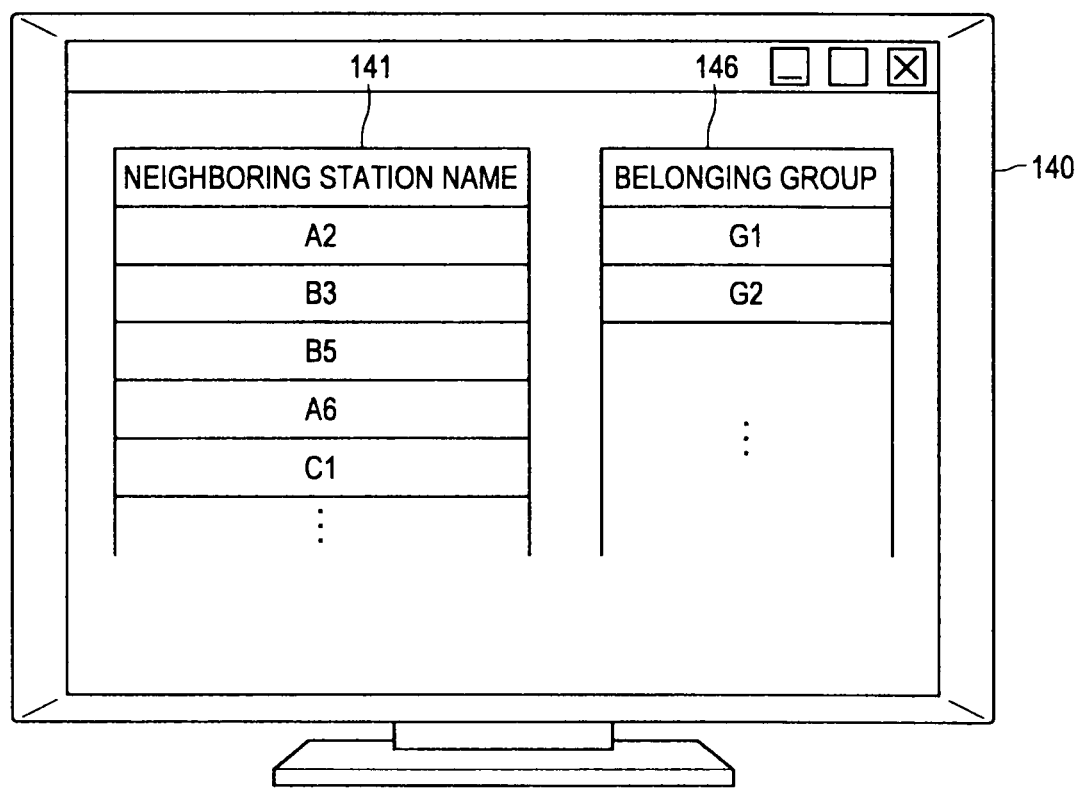

| VIEWING NEWS GENRE | VIEWING COUNT |
|---|---|
| WEATHER | 34 |
| SPORTS | 22 |
| COOKING | 18 |
| ⋮ | ⋮ |

FIG.22

| NEIGHBORING STATION NAME | ACTIVATION COUNT OF APPLICATION P |
|---|---|
| A2 | 124 |
| B3 | 88 |
| B5 | 12 |
| ⋮ | ⋮ |

FIG.23

| ACTIVATION COUNT OF APPLICATION P | INFORMATION CARRYING INFORMATIOPAGE NAME (1) | INFORMATION CARRYING PAGE NAME (2) |
|---|---|---|
| 100 TIMES OR MORE | BAR INFORMATION | LUNCH INFORMATION |
| LESS THAN 100 TIMES | SIGHTSEEING INFORMATION | BARGAIN INFORMATION |
| | | |

| NEIGHBORING STATION NAME | REPRODUCTION COUNT OF CONTENT DATA S | REPRODUCTION COUNT OF CONTENT DATA T |
|---|---|---|
| A2 | 112 | 20 |
| B3 | 37 | 236 |
| B5 | 12 | 15 |
| ⋮ | ⋮ | ⋮ |

FIG.26

| CONTENT DATA NAME | CONTENT DATA ANALYSIS RESULT |
|---|---|
| S | CHEERFUL |
| T | DREARY |
| ⋮ | ⋮ |

FIG.27

| CONTENT DATA NAME | REPRODUCTION COUNT | INFORMATION CARRYING PAGE NAME |
|---|---|---|
| CHEERFUL | 100 TIMES OR MORE | CHEERFUL BAR INFORMATION |
| DREARY | 200 TIMES OR MORE | REFRESHING BAR INFORMATION |
| ⋮ | ⋮ | ⋮ |

COMBINED LOCATION AND FREQUENCY INFORMATION PROCESSING APPARATUS, METHOD, AND PROGRAM

BACKGROUND OF THE INVENTION

1. Field of the Invention

The present invention relates to an information processing apparatus, an information processing method, and a program.

2. Description of the Related Art

Nowadays, a receiving apparatus capable of receiving a radio signal transmitted from a satellite is mounted in movable bodies such as automobiles and mobile phones. According to GPS (Global Positioning System) positioning, the position of a moving body in which such a receiving apparatus is mounted can be estimated. Position estimation technology using such a receiving apparatus is an important common fundamental technology in a wide variety of fields such as navigation, security, and entertainment.

Japanese Patent Application Laid-Open No. 2006-171012 discloses a technology in which PHS (Personal Handy System) measures signal intensity of a signal transmitted from a base station and estimates the position of the local machine based on the measured signal intensity. More specifically, a base station of PHS is installed by a communication operator and thus, the installation location thereof is normally known. Therefore, if PHS measures signal intensity of signals transmitted from three base stations or more and estimates the distance between each base station and the local machine based on the measured signal intensity, the position of the local machine can be estimated based on the principle of triangulation in which the installation position of each base station is used as a reference.

Also, a position estimation technology in which an information processing apparatus that performs radio communication with a base station (access point) of wireless LAN (Local Area Network) measures signal intensity of a signal transmitted from the base station and an information management apparatus communicable with the information processing apparatus estimates the position of the information processing apparatus based on the signal intensity can be considered. For example, a base station of wireless LAN transmits a beacon to signal the presence of the base station of the wireless LAN around the base station at fixed periods (for example, 5 times/sec). The information processing apparatus transmits signal intensity of such a beacon to the information management apparatus and the information management apparatus can estimate the position of the information processing apparatus based on the signal intensity and the position of the wireless LAN registered in advance.

SUMMARY OF THE INVENTION

However, according to the position positioning technology described above, while the position of an information processing apparatus can be estimated, there is an issue that it is difficult to provide information about locations frequently visited by users of the information processing apparatus to the users.

The present invention has been made in view of the above issue and there is a need for a novel and improved technology capable of providing information about locations frequently visited by users of the information processing apparatus to the users.

According to an embodiment of the present invention, there is provided an information processing apparatus including an acquired information storage unit capable of storing acquired information that associates one or a plurality of pieces of mutually different position information and an acquisition count of each of one or the plurality of pieces of position information, an acquisition unit that acquires the position information indicating a position of a local apparatus, an acquisition count measuring unit that, when the acquisition unit acquires the position information, adds a predetermined value to the acquisition count associated with the acquired position information, and a control unit that sorts the acquired information stored in the acquired information storage unit in descending order of the acquisition count.

The information processing apparatus may further include a display unit. The control unit may cause the display unit to display the position information of the acquired information stored in the acquired information storage unit in the sorted order.

The information processing apparatus may further include a storage unit that stores browsing data identification information to identify browsing data displayed in the display unit. The control unit may further cause the display unit to display the browsing data identification information stored in the storage unit.

The information processing apparatus may further include an input unit. The control unit when the input unit accepts input of position selection information to select one piece of the position information displayed in the display unit and browsing data selection information to select one piece of the browsing data identification information displayed in the display unit, may acquire the browsing data identified by the browsing data identification information selected based on the browsing data selection information and related to the position information selected based on the position selection information from another apparatus and may cause the display unit to display the browsing data.

The storage unit may further store time zone conditions indicating conditions for a date, a day of week or a time associated with the browsing data identification information and the control unit may acquire a current date, day of week or time as current information, may determine whether the acquired current information satisfies the time zone conditions and, if it is determined that the time zone conditions are satisfied, may cause the display unit to display the browsing data identification information associated with the time zone conditions.

The storage unit may further store a search keyword indicating a term specified as a key when a search is performed by the control unit and the control unit may cause the display unit to display the search keywords stored in the storage unit and, when the input unit further accepts input of search keyword selection information to select one of the search keywords displayed in the display unit, acquires the browsing data identified by the browsing data identification information selected based on the browsing data selection information, related to the position information selected based on the position selection information, and related to the search keyword selected based on the search keyword selection information from another apparatus and causes the display unit to display the browsing data.

The information processing apparatus may further include an input unit and a storage unit that stores group identification data to identify a belonging group of a user. The control unit may cause the display unit to display the group identification data stored in the storage unit and, when the input unit accepts input of position selection information to select one piece of the position information displayed in the display unit and group selection information to select one piece of the group identification data displayed in the display unit, acquires the browsing data related to the group identification data selected based on the group selection information and related to the position information selected based on the position selection information from another apparatus and may cause the display unit to display the browsing data.

The information processing apparatus may further include an input unit, a storage unit that stores content data, and a reproducing unit that, when the content data stored in the storage unit is reproduced, acquires information about the reproduced content data and causes the storage unit to store the information as related information. The control unit may cause the display unit to display the related information stored in the storage unit and, when the input unit accepts input of position selection information to select one piece of the position information displayed in the display unit and related information selection information to select the related information displayed in the display unit, acquires the browsing data related to the related information selected based on the related information selection information and related to the position information selected based on the position selection information from another apparatus and causes the display unit to display the browsing data.

The information processing apparatus may further include an input unit, a storage unit that stores application data as well as browsing data identification information to identify browsing data displayed in the display unit and associates application data identification information to identify the application data, an activation count indicating a number of times of activating the application data, and position information for storage, and an activation count measuring unit that, when the application data stored in the storage unit is activated by the control unit, adds a predetermined value to the activation count associated with the position information indicating the position of the local apparatus during activation of the application acquired by the acquisition unit and the application data identification information corresponding to the activated application data. The control unit may further cause the display unit to display the browsing data identification information in accordance with the application data identification information corresponding to the position information indicating the current position acquired by the acquisition unit and the activation count and, when the input unit accepts input of position selection information to select one piece of the position information displayed in the display unit and browsing data selection information to select one piece of the browsing data identification information displayed in the display unit, acquires the browsing data related to the browsing data identification information selected based on the browsing data selection information and related to the position information selected based on the position selection information from another apparatus and may cause the display unit to display the browsing data.

The information processing apparatus may further include an input unit, a storage unit that stores content data as well as browsing data identification information to identify browsing data displayed in the display unit, associates content data identification information to identify the content data and content analysis results obtained by analyzing the content data for storage, and associates the content data identification information, a reproduction count indicating a number of times of reproducing the content data, and position information for storage, and an reproducing unit that, when the content data stored in the storage unit is reproduced, adds a predetermined value to the reproduction count associated with the position information indicating the position of the local apparatus during reproduction of the content data acquired by the acquisition unit and the content data identification information corresponding to the reproduced content data. The control unit may further cause the display unit to display the browsing data identification information in accordance with the content analysis results corresponding to the content data identification information corresponding to the position information indicating the current position acquired by the acquisition unit and the reproduction count and, when the input unit accepts input of position selection information to select one piece of the position information displayed in the display unit and browsing data selection information to select one piece of the browsing data identification information displayed in the display unit, acquires the browsing data related to the browsing data identification information selected based on the browsing data selection information and related to the position information selected based on the position selection information from another apparatus and may cause the display unit to display the browsing data.

The acquired information storage unit may store address information as the position information and the acquisition count measuring unit may convert, when the acquisition unit acquires the position information, the acquired position information into address information and add a predetermined value to the acquisition count associated with the address information.

The acquired information storage unit may store neighboring station information as the position information and the acquisition count measuring unit may convert, when the acquisition unit acquires the position information, the acquired position information into neighboring station information indicating a neighboring station present near the position information and add a predetermined value to the acquisition count associated with the neighboring station information.

The information processing apparatus may further include a display unit and a storage unit that stores browsing data identification information to identify browsing data displayed in the display unit and associates route information indicating a route and station information indicating a station present on the route for storage. The control unit may cause the display unit to display the neighboring station information of the acquired information stored in the acquired information storage unit after being sorted in descending order of the acquisition count associated with the neighboring station information and acquire the station information that is associated with the route information in which the neighboring station information is present and is not the neighboring station information from the storage unit to cause the display unit to display the station information.

According to the present invention, as described above, information about locations frequently visited by users of the information processing apparatus can be provided to the users.

BRIEF DESCRIPTION OF THE DRAWINGS

FIG. 3 is a diagram showing a data structure example of acquired information stored in an acquired information storage unit of the information processing apparatus according to the first embodiment of the present invention;

FIG. 5 is a diagram showing a data structure example of acquired information when address information is used;

FIG. 7 is a diagram showing a data structure example of acquired information when neighboring station information is used;

FIG. 12 is a diagram showing a data structure example of information carrying page information when time zone conditions are used;

FIG. 13 is a diagram showing a display example of information carrying page information when time zone conditions are used;

FIG. 14 is a diagram showing a data structure example of correspondence information between route information and station information;

FIG. 15 is a diagram showing a display example of correspondence information between route information and station information;

FIG. 18 is a diagram showing a data structure example of group identification data;

FIG. 19 is a diagram showing a display example of the group identification data;

FIG. 22 is a diagram showing a data structure example of correspondence information between position information and the activation count of application;

FIG. 23 is a diagram showing a data structure example of correspondence information between a range of the activation count of application and browsing data identification information;

FIG. 26 is a diagram showing a data structure example of correspondence information between content data identification information and content data analysis results;

FIG. 27 is a diagram showing a data structure example of correspondence information among content data analysis results, the range of reproduction count of content data, and browsing data identification information.

DETAILED DESCRIPTION OF THE EMBODIMENTS

Figure 1:
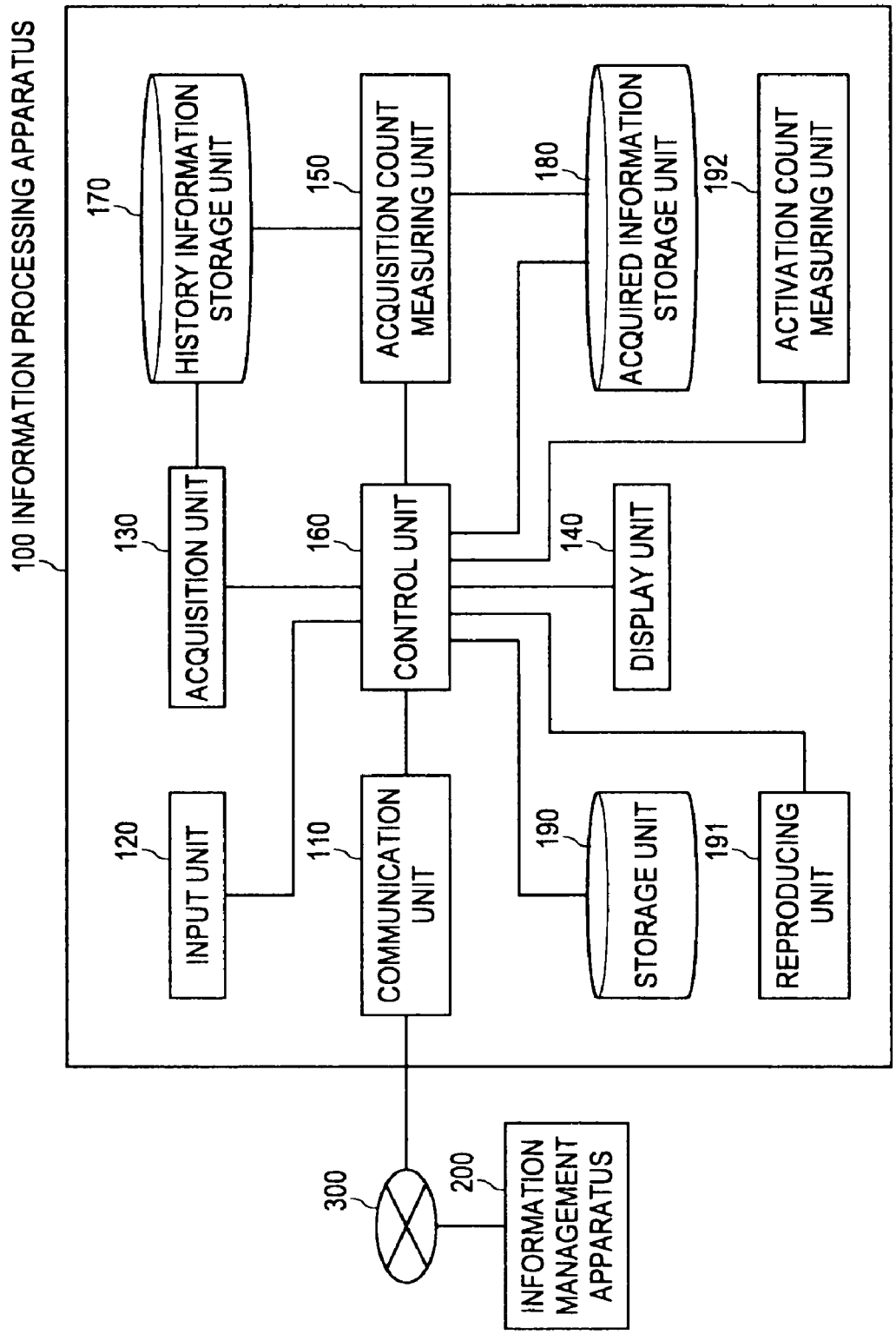
FIG. 1 is a block diagram showing a functional configuration of an information processing apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. Description will be made in the following order.

1. First Embodiment
 1-1. Functional Configuration of Information Processing Apparatus
 1-2. Hardware Configuration of Information Processing Apparatus
 1-3. Data Structure of Acquired Information
 1-4. Operation of Information Processing Apparatus
 1-5. Data Structure Example of Acquired Information When Address Information Is Used
 1-6. Operation of Information Processing Apparatus When Address Information Is Used
 1-7. Data Structure Example of Acquired Information When Neighboring Station Information Is Used
 1-8. Operation of Information Processing Apparatus When Neighboring Station Information Is Used
 1-9. Data Structure Example of Information Carrying Page Information
 1-10. Display Example of Information by Display Unit
 1-11. Data Structure Example of Information Carrying Page Information When Time Zone Conditions Are Used
 1-12. Display Example of Information Carrying Page Information When Time Zone Conditions Are Used
 1-13. Data Structure Example of Correspondence Information between Route Information and Station Information
 1-14. Display Example of Correspondence Information between Route Information and Station Information
 1-15. Data Structure Example of Correspondence Information between Search Keyword and Search Count
 1-16. Display Example of Search Keyword
 1-17. Data Structure Example of Group Identification Data
 1-18. Display Example of Group Identification Data
 1-19. Data Structure Example of Correspondence Information between Related Keyword and Reproduction Count
 1-20. Display Example of Related Keyword
 1-21. Data Structure Example of Correspondence Information between Position Information and Activation Count of Application
 1-22. Data Structure of Correspondence Information between Range of Activation Count of Application and Browsing Data Identification Information
 1-23. Display Example of Browsing Data Identification Information When Activation Count of Application Is Used
 1-24. Data Structure Example of Correspondence Information between Position Information and Reproduction Count of Content Data 1-25. Data Structure of Correspondence Information between Content Data Identification Information and Content Data Analysis Results 1-26. Data Structure of Correspondence Information among Content Data Analysis Results, Range of Reproduction Count of Content Data, and Browsing Data Identification Information 1-27. Display Example of Browsing Data Identification Information When Content Data Analysis Results Are Used 2. Summary 3. Modification of the Present Embodiment The embodiment will be described in following order.

1. First Embodiment

First, the first embodiment of the present invention will be described.

[1-1. Functional Configuration of Information Processing Apparatus]

First, the functional configuration of an information processing apparatus according to the first embodiment of the present invention will be described. FIG. 1 is a block diagram showing the functional configuration of an information processing apparatus according to the first embodiment of the present invention. The functional configuration of an information processing apparatus according to the first embodiment of the present invention will be described below using FIG. 1.

As shown in FIG. 1, an information processing apparatus 100 can communicate with an information management apparatus 200, for example, via a network 300. When browsing data identification information to identify browsing data is received from the information processing apparatus 100 via the network 300, the information management apparatus 200 transmits browsing data identified by the received browsing data identification information to the information processing apparatus 100. In the present embodiment, the information processing apparatus 100 is assumed to be capable of performing communication with the information management apparatus 200 via the network 300, but the information processing apparatus 100 may be capable of performing communication with the information management apparatus 200, for example, via a dedicated line.

Browsing data transmitted by the information management apparatus 200 may be browsing data held by the information management apparatus 200 or browsing data held by an apparatus other than the information management apparatus 200 and acquired based on browsing data identification information received by the information management apparatus 200 from the information processing apparatus 100.

In the present embodiment, an address where browsing data is stored is used as browsing data identification information, but the browsing data identification information is not specifically limited as long as the information identifies browsing data. A URL (Uniform Resource Locator) may be used as browsing data identification information and HTML (HyperText Markup Language) documents or various kinds of data (such as image data) thereunder may be used as browsing data. In that case, the information management apparatus 200 functions as a Web server and transmits an HTML document or the like as an example of the browsing data specified by a URL as an example of the browsing data identification information transmitted from the information processing apparatus 100 to the information processing apparatus 100.

The information processing apparatus 100 may be, for example, a PC (Personal Computer), home video processing apparatus (such as a DVD recorder and VCR), mobile phone, PHS (Personal Handy System), mobile music reproducing apparatus, mobile video processing apparatus, PDA (Personal Digital Assistant), home game machine, mobile game machine, or household appliance. The information processing apparatus 100 can be carried by the user and so that the position of the information processing apparatus 100 may change as the user moves.

The information processing apparatus 100 includes at least an acquired information storage unit 180, an acquisition unit 130, an acquisition count measuring unit 150, and a control unit 160. The information processing apparatus 100 may also include a communication unit 110, an input unit 120, a display unit 140, a history information storage unit 170, a storage unit 190, a reproduction unit 191, an activation count measuring unit 192 and the like. The input unit 120 and the storage unit 190 will be described later using FIG. 9 to FIG. 11 and the like. The reproduction unit 191 and the activation count measuring unit 192 will be described later using FIG. 20 to FIG. 28 and the like The acquired information storage unit 180 is made up of, for example, a magnetic storage device such as an HDD (Hard Disk Drive), semiconductor storage device, optical storage device, magneto-optical storage device or the like. The acquired information storage unit 180 can store acquired information by associating one or a plurality of pieces of mutually different position information and the acquisition count of each of one or the plurality of pieces of position information.

The acquisition unit 130 is made up of, for example, a CPU (Central Processing Unit), ROM (Read Only Memory), RAM (Random Access Memory) and the like. The acquisition unit 130 can acquire position information indicating the position of the local apparatus. In the present embodiment, the acquisition unit 130 is assumed to acquire position information at predetermined intervals (for example, every minute). However, the timing to acquire position information is not specifically limited and, for example, position information may be acquired continuously.

The format of position information is not limited to a format using the latitude and longitude and may be, for example, a format using x and y coordinates, a format using polar coordinates, or a format using a vector. Acquisition of position information is not specifically limited. The acquisition unit 130 may acquire position information of the local apparatus by measuring the position of the local apparatus based on a signal received from a satellite via the communication unit 110 or acquire position information indicating the position of the information processing apparatus 100 from a server that estimates the position of the information processing apparatus 100.

In the present embodiment, the acquisition unit 130 is assumed to register the acquired position information in the history information storage unit 170 as history information, but may directly output the position information to the acquisition count measuring unit 150. Also, the acquisition unit 130 may register the acquired position information in the history information storage unit 170 by associating with time information indicating the time at which the position information was acquired. Also, the acquisition unit 130 may output the acquired position information to the acquisition count measuring unit 150 by associating with time information indicating the time at which the position information was acquired.

The acquisition count measuring unit 150 is made up of, for example, a CPU, ROM, RAM and the like. When the acquisition unit 130 acquires position information, the acquisition count measuring unit 150 adds a predetermined value to the acquisition count stored in the acquired information storage unit 180 by being associated with the acquired position information. The predetermined value is not specifically limited and may be, for example, "1" or any other positive integer. In the present embodiment, position information acquired by the acquisition unit 130 is registered in the history information storage unit 170 as history information and the acquisition count measuring unit 150 is assumed to perform an addition at predetermined intervals (for example, every five minutes) for unprocessed history information. However, the timing to perform an addition is not specifically limited and an addition may be performed each time the acquisition unit 130 acquires position information.

The control unit 160 is made up of, for example, a CPU, ROM, RAM and the like and sorts acquired information stored in the acquired information storage unit 180 in descending order of acquisition count. The acquisition count is contained in acquired information stored in the acquired information storage unit 180. The control unit 160 may cause the display unit 140 to display position information of acquired information stored in the acquired information storage unit 180 by sorting the position information.

The history information storage unit 170 is made up of, for example, a magnetic storage device such as an HDD (Hard Disk Drive), semiconductor storage device, optical storage device, magneto-optical storage device or the like. The history information storage unit 170 stores position information acquired by the acquisition unit 130 as history information. The history information storage unit 170 may further store position information by associating with time information at which the position information was acquired.

The display unit 140 is made up of an apparatus, for example, a display apparatus such as a CRT (Cathode Ray Tube) display apparatus, liquid crystal display apparatus, plasma display apparatus, EL (ElectroLuminescence) display apparatus, or lamp capable of visually notifying the user of acquired information. The display unit 140 is shown only as an example of the output apparatus and the output apparatus may be an audio output apparatus such as a speaker and headphone.

The communication unit 110 is made up of, for example, a communication apparatus and can perform communication with the information management apparatus 200 via the network 300. The communication unit 110 may be configured, for example, as having a function as a receiving unit to receive a signal (for example, a beacon signal) transmitted by neighboring base stations. In that case, the communication unit 110 may be made up by including a wireless LAN compatible communication apparatus, GPS compatible communication apparatus, Bluetooth compatible communication apparatus or the like. Also, the communication unit 110 may be configured as having a function as a receiving unit to receive a signal from a satellite. In that case, the communication unit 110 is configured by including an antenna or the like capable of receiving a signal from a satellite.

In the foregoing, the functional configuration of the information processing apparatus 100 according to the first embodiment of the present invention has been described. Next, the hardware configuration of the information processing apparatus 100 according to the first embodiment of the present invention will be described.

[1-2. Hardware Configuration of Information Processing Apparatus]

Figure 2:
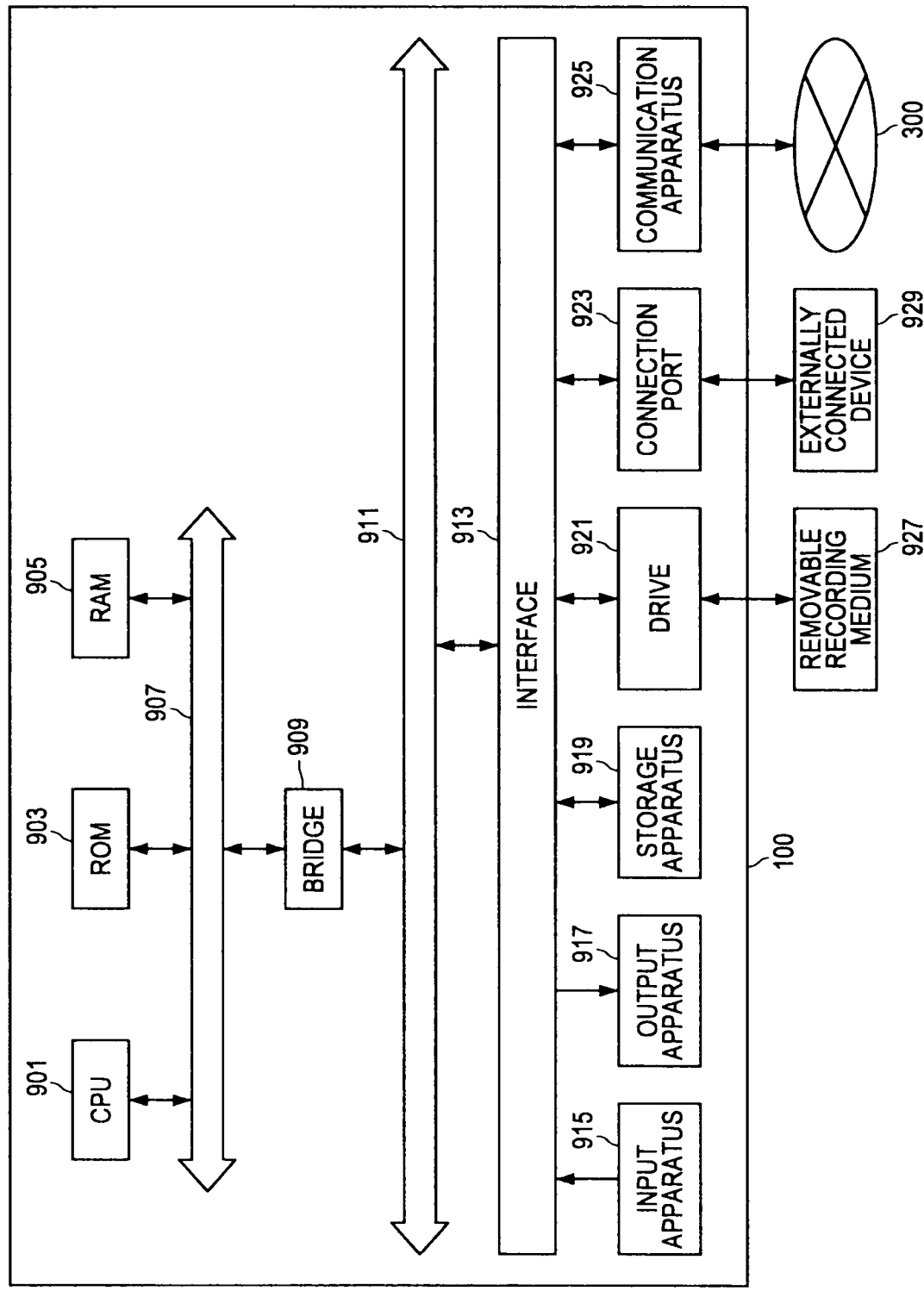
FIG. 2 is a block diagram showing a hardware configuration of the information processing apparatus according to the first embodiment of the present invention.

Next, the hardware configuration of an information processing apparatus according to the first embodiment of the present invention will be described. FIG. 2 is a block diagram showing the hardware configuration of an information processing apparatus according to the first embodiment of the present invention. The hardware configuration of an information processing apparatus according to the first embodiment of the present invention will be described below using FIG. 2.

The information processing apparatus 100 mainly includes a CPU 901, a ROM 903, a RAM 905, a host bus 907, a bridge 909, an external bus 911, an interface 913, an input apparatus 915, an output apparatus 917, a storage apparatus 919, a drive 921, a connection port 923, and a communication apparatus 925.

The CPU 901 functions as an arithmetic processing unit and a control unit and controls an overall operation in the information processing apparatus 100 or a portion thereof according to various programs recorded in the ROM 903, the RAM 905, the storage apparatus 919, or a removable recording medium 927. The ROM 903 stores programs and operation parameters used by the CPU 901. The RAM 905 temporarily stores programs used for execution of the CPU 901 and parameters and the like that change when appropriate during execution thereof. These units are mutually connected by the host bus 907 made up of an internal bus such as a CPU bus.

The host bus 907 is connected to the external bus 911 such as a PCI (Peripheral Component Interconnect/Interface) bus via the bridge 909.

The input apparatus 915 is operation means operated by the user such as a mouse, keyboard, touch panel, button, switch, and lever. The input apparatus 915 may also be remote control means (the so-called remocon) using infrared rays or other radio waves or an externally connected device 929 such as a mobile phone and PDA compatible with operations of the information processing apparatus 100. Further, the input apparatus 915 is made up of, for example, an input control circuit that generates an input signal based on information input by the user using the above operation means and outputs the input signal to the CPU 901. The user of the information processing apparatus 100 can input various kinds of data into the information processing apparatus 100 and provide instructions of processing operation by operating the input apparatus 915.

The output apparatus 917 is made up of an apparatus, for example, a display apparatus such as a CRT display apparatus, liquid crystal display apparatus, plasma display apparatus, EL display apparatus, or lamp, audio output apparatus such as a speaker and headphone, printer apparatus, mobile phone, or facsimile capable of visually or aurally notifying the user of acquired information. The output apparatus 917 outputs, for example, results obtained by various kinds of processing performed by the information processing apparatus 100. More specifically, the display apparatus displays results obtained by various kinds of processing performed by the information processing apparatus 100 as text or images. The audio output apparatus, on the other hand, outputs an audio signal made up of reproduced audio data, acoustic data and the like after the audio signal being converted into an analog signal.

The storage apparatus 919 is an apparatus for data storage and constituted as an example of the storage unit of the information processing apparatus 100 and is made up of, for example, a magnetic storage device such as an HDD (Hard Disk Drive), semiconductor storage device, optical storage device, magneto-optical storage device or the like. The storage apparatus 919 stores programs executed by the CPU 901, various kinds of data, and acoustic signal data and image signal data acquired from outside.

The drive 921 is a reader/writer for recording media and is added to the information processing apparatus 100 internally or externally. The drive 921 reads information recorded in the removable recording medium 927 such as an inserted magnetic disk, optical disk, magneto-optical disk, and semiconductor memory and outputs the information to the RAM 905. The drive 921 can also write a record into the removable recording medium 927 such as an inserted magnetic disk, optical disk, magneto-optical disk, and semiconductor memory. The removable recording medium 927 is, for example, a DVD medium, HD-DVD medium, Blu-ray medium, CompactFlash (CF) (registered trademark), memory stick, or SD memory card (Secure Digital memory card). The removable recording medium 927 may also be, for example, an IC card (Integrated Circuit card) on which a non-contact IC chip is mounted, electronic device or the like.

The connection port 923 is a port to directly connect devices to the information processing apparatus 100, for example, a USB (Universal Serial Bus) port, IEEE1394 port such as i. Link, SCSI (Small Computer System Interface) port, RS-232C port, optical audio terminal, and HDMI (High-Definition Multimedia Interface) port. By connecting the externally connected device 929 to the connection port 923, the information processing apparatus 100 can acquire acoustic signal data or image signal data directly from the externally connected device 929 or provide acoustic signal data or image signal data to the externally connected device 929.

The communication apparatus 925 is a communication interface made up of, for example, a communication device to connect to the network 300. The communication apparatus 925 is, for example, a communication card for a wire or wireless LAN (Local Area Network), Bluetooth, or WUSB (Wireless USB), router for optical communication, router for ADSL (Asymmetric Digital Subscriber Line), or modem for various kinds of communication. For example, the communication apparatus 925 can transmit/receive acoustic signal or the like to/from the Internet and other communication devices. The network 300 connected to the communication apparatus 925 is made up of a network or the like connected by wire or by radio and may be, for example, the Internet, a home LAN, infrared-ray communication, radio wave communication, or satellite communication.

In the foregoing, an example of the hardware configuration that can realize the function of the information processing apparatus 100 according to the present embodiment of the present invention has been described. Each of the above components may be made up by using general-purpose members or by hardware specialized for the function of each component. Therefore, the hardware configuration to be used can be changed when appropriate in accordance with the technical level when the embodiment is carried out.

In the foregoing, the hardware configuration of the information processing apparatus 100 according to the first embodiment of the present invention has been described. Next, a data structure example of acquired information stored in the acquired information storage unit 180 of the information processing apparatus 100 according to the first embodiment of the present invention will be described.

[1-3. Data Structure of Acquired Information]

Next, a data structure example of acquired information stored in an acquired information storage unit of an information processing apparatus according to the first embodiment of the present invention will be described. FIG. 3 is a diagram showing a data structure example of acquired information stored in an acquired information storage unit of an information processing apparatus according to the first embodiment of the present invention. A data structure example of acquired information stored in an acquired information storage unit of an information processing apparatus according to the first embodiment of the present invention will be described below using FIG. 3.

As shown in FIG. 3, acquired information stored in the acquired information storage unit 180 of the information processing apparatus 100 has a structure in which one or a plurality of pieces of mutually different position information and the acquisition count of each of one or the plurality of pieces of position information are associated. FIG. 3 shows the latitude and longitude as an example of the position information.

In the foregoing, a data structure example of acquired information stored in the acquired information storage unit 180 of the information processing apparatus 100 according to the first embodiment of the present invention has been described. Next, the operation of the information processing apparatus 100 according to the first embodiment of the present invention will be described.

[1-4. Operation of Information Processing Apparatus]

Figure 4:
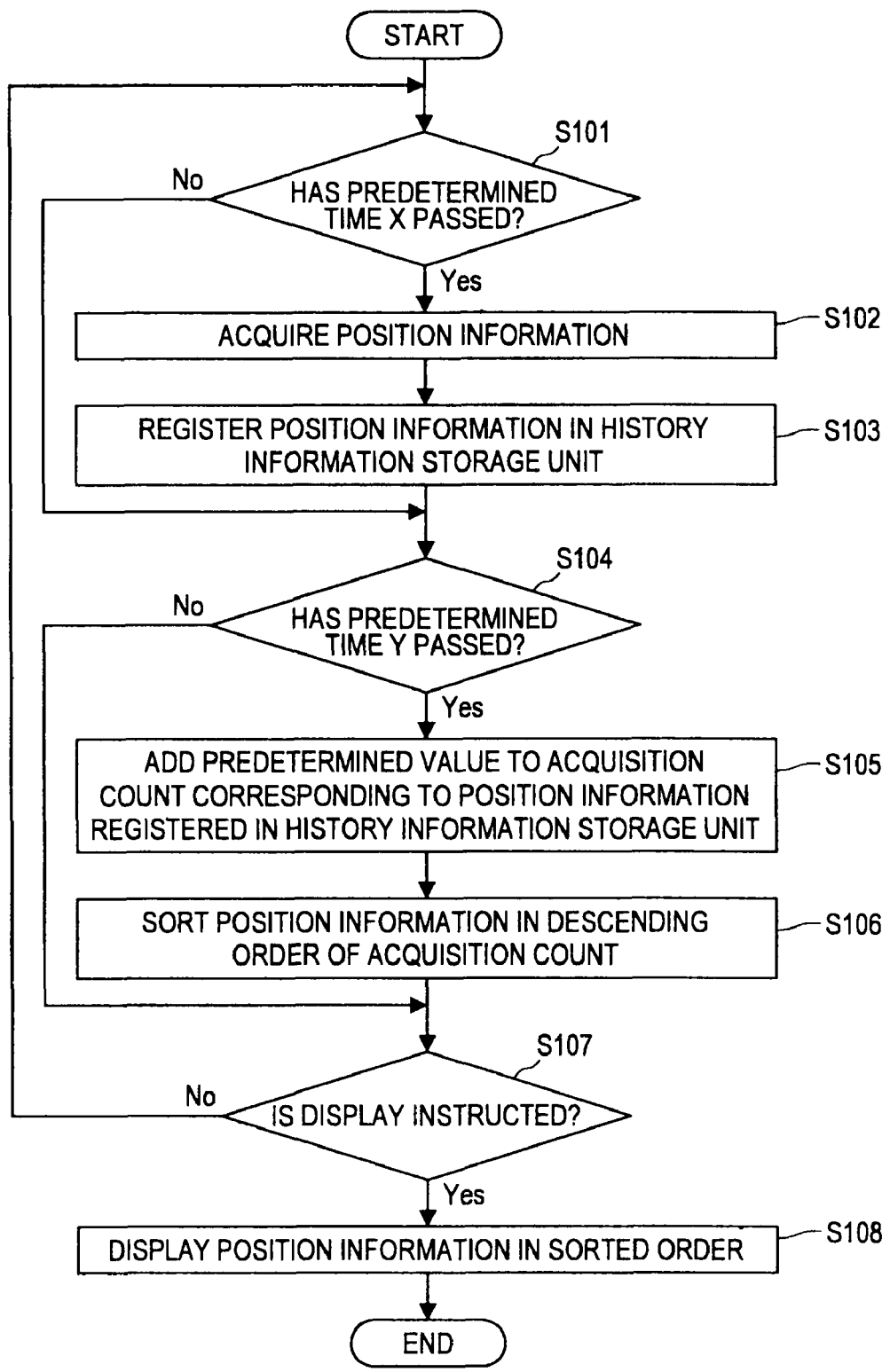
FIG. 4 is a flow chart showing an operation of the information processing apparatus according to the first embodiment of the present invention.

Next, the operation of the information processing apparatus 100 according to the first embodiment of the present invention will be described. FIG. 4 is a flow chart showing the operation of an information processing apparatus according to the first embodiment of the present invention. The operation of an information processing apparatus according to the first embodiment of the present invention will be described below using FIG. 4.

As shown in FIG. 4, the acquisition unit 130 determines whether a predetermined time X (for example, one minute) has passed (step S101). If the acquisition unit 130 determines that the predetermined time X has not passed ("No" at step S101), the acquisition unit 130 proceeds to step S104. If the acquisition unit 130 determines that the predetermined time X has passed ("Yes" at step S101), the acquisition unit 130 acquires position information of the local apparatus (step S102) and registers the acquired position information in the history information storage unit 170 (step S103).

Subsequently, the acquisition count measuring unit 150 determines whether a predetermined time Y (for example, five minutes) has passed (step S104). If the acquisition count measuring unit 150 determines that the predetermined time Y has not passed ("No" at step S104), the acquisition count measuring unit 150 proceeds to step S107. If the acquisition count measuring unit 150 determines that the predetermined time Y has passed ("Yes" at step S104), the acquisition count measuring unit 150 searches the acquired information storage unit 180 for an acquisition count corresponding to unprocessed position information registered in the history information storage unit 170 and adds a predetermined value (for example, "1") to the acquisition count (step S105). It is assumed, for example, that a processing complete flag to determine whether processing is completed is attached to each piece of position information. In that case, a value indicating that position information is not processed is set to a processing complete flag attached to position information for which addition is not completed and the acquisition count measuring unit 150 sets a value indicating completion of processing to a processing complete flag attached to position information for which addition is completed.

Subsequently, the control unit 160 sorts acquired information stored in the acquired information storage unit 180 in descending order of acquisition count (step S106). The control unit 160 determines whether the input unit 120 has accepted input of any display instruction from the user (step S107). If the control unit 160 determines that the input unit 120 has not accepted input of any display instruction from the user ("No" at step S107), the control unit 160 returns to step S101 to continue processing. If the control unit 160 determines that the input unit 120 has accepted input of a display instruction from the user ("Yes" at step S107), the control unit 160 displays the position information in the sorted order (step S108) before terminating processing.

In the foregoing, the operation of an information processing apparatus 100 according to the first embodiment of the present invention has been described. Incidentally, it is conceivable that the acquired information storage unit 180 may store address information as position information. In that case, the acquisition count measuring unit 150 may convert position information acquired by an acquisition unit 130 into address information to search the acquired information storage unit 180 for the acquisition count associated with the address information obtained by the conversion and to add a predetermined value to the acquisition count. While it becomes necessary to have position/address correspondence information in which position information and address information are associated to be used for conversion of position information into address information, the position/address correspondence information may be stored in the storage unit 190 or outside the information processing apparatus 100. Next, a data structure example of acquired information when address information is used will be described.

[1-5. Data Structure Example of Acquired Information when Address Information is Used]

Next, a data structure example of acquired information when address information is used will be described. FIG. 5 is a diagram showing a data structure example of acquired information when address information is used. A data structure example of acquired information when address information is used will be described using FIG. 5.

When address information is used, as shown in FIG. 5, acquired information stored in the acquired information storage unit 180 of the information processing apparatus 100 has a structure in which one or a plurality of pieces of mutually different address information and the acquisition count of each of one or the plurality of pieces of address information are associated.

In the foregoing, a data structure example of acquired information when address information is used has been described. Next, the operation of the information processing apparatus 100 when address information is used will be described.

[1-6. Operation of Information Processing Apparatus when Address Information is Used]

Figure 6:
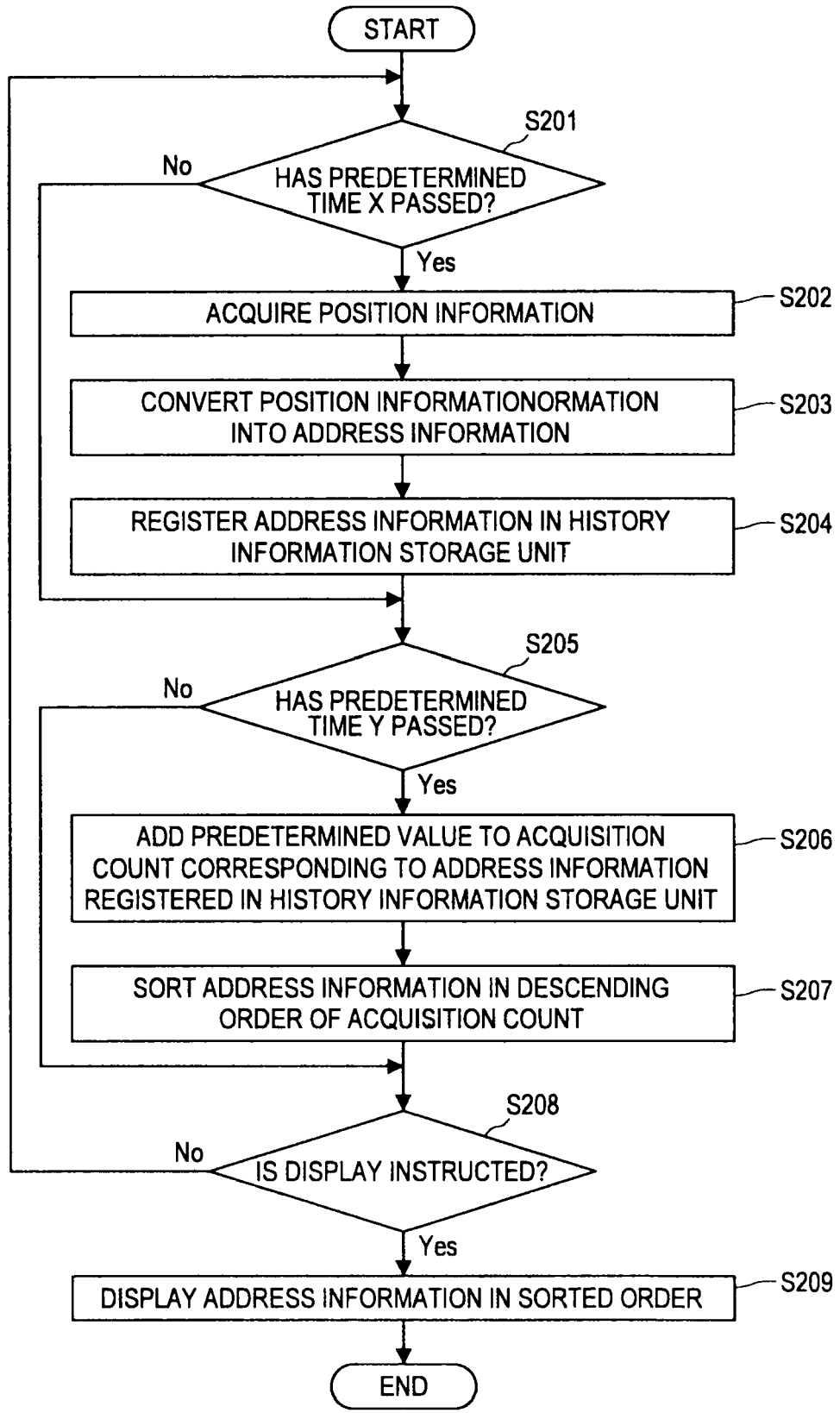
FIG. 6 is a flow chart showing the operation of the information processing apparatus when address information is used.

Next, the operation of the information processing apparatus when address information is used will be described. FIG. 6 is a flow chart showing the operation of the information processing apparatus when address information is used. The operation of the information processing apparatus when address information is used will be described below using FIG. 6.

As shown in FIG. 6, the acquisition unit 130 determines whether the predetermined time X (for example, one minute) has passed (step S201). If the acquisition unit 130 determines that the predetermined time X has not passed ("No" at step S201), the acquisition unit 130 proceeds to step S205. If the acquisition unit 130 determines that the predetermined time X has passed ("Yes" at step S201), the acquisition unit 130 acquires position information of the local apparatus (step S202), converts the acquired position information into address information (step S203), and registers the address information obtained by the conversion in the history information storage unit 170 (step S204).

Subsequently, the acquisition count measuring unit 150 determines whether the predetermined time Y (for example, five minutes) has passed (step S205). If the acquisition count measuring unit 150 determines that the predetermined time Y has not passed ("No" at step S205), the acquisition count measuring unit 150 proceeds to step S208. If the acquisition count measuring unit 150 determines that the predetermined time Y has passed ("Yes" at step S205), the acquisition count measuring unit 150 searches the acquired information storage unit 180 for an acquisition count corresponding to unprocessed address information registered in the history information storage unit 170 and adds a predetermined value (for example, "1") to the acquisition count (step S206). It is assumed, for example, that a processing complete flag to determine whether processing is completed is attached to each piece of address information. In that case, a value indicating that address information is not processed is set to a processing complete flag attached to address information for which addition is not completed and the acquisition count measuring unit 150 sets a value indicating completion of processing to a processing complete flag attached to address information for which addition is completed.

Subsequently, the control unit 160 sorts acquired information stored in the acquired information storage unit 180 in descending order of acquisition count (step S207). The control unit 160 determines whether the input unit 120 has accepted input of any display instruction from the user (step S208). If the control unit 160 determines that the input unit 120 has not accepted input of any display instruction from the user ("No" at step S208), the control unit 160 returns to step S201 to continue processing. If the control unit 160 determines that the input unit 120 has accepted input of a display instruction from the user ("Yes" at step S208), the control unit 160 displays the address information in the sorted order (step S209) before terminating processing.

In the foregoing, the operation of the information processing apparatus 100 when address information is used has been described. Incidentally, it is conceivable that the acquired information storage unit 180 may store neighboring station information as position information. In that case, the acquisition count measuring unit 150 may convert position information acquired by an acquisition unit 130 into neighboring station information to search the acquired information storage unit 180 for the acquisition count associated with the neighboring station information obtained by the conversion and to add a predetermined value to the acquisition count. While it becomes necessary to have position/neighboring station correspondence information in which position information and neighboring station information are associated to be used for conversion of position information into neighboring station information, the position/neighboring station correspondence information may be stored in the storage unit 190 or outside the information processing apparatus 100. The association of position information and neighboring station information is not specifically limited and, for example, position information indicating a position of a predetermined distance (for example, 100 m) or less from a station may be associated with the station as a neighboring station. Next, a data structure example of acquired information when neighboring station information is used will be described.

[1-7. Data Structure Example of Acquired Information when Neighboring Station Information is Used]

Next, a data structure example of acquired information when neighboring station information is used will be described. FIG. 7 is a diagram showing a data structure example of acquired information when neighboring station information is used. A data structure example of acquired information when neighboring station information is used will be described using FIG. 7.

When neighboring station information is used, as shown in FIG. 7, acquired information stored in the acquired information storage unit 180 of the information processing apparatus 100 has a structure in which one or a plurality of pieces of mutually different neighboring station information and the acquisition count of each of one or the plurality of pieces of neighboring station information are associated.

In the foregoing, a data structure example of acquired information when neighboring station information is used has been described. Next, the operation of the information processing apparatus 100 when neighboring station information is used will be described.

[1-8. Operation of Information Processing Apparatus when Neighboring Station Information is Used]

Figure 8:
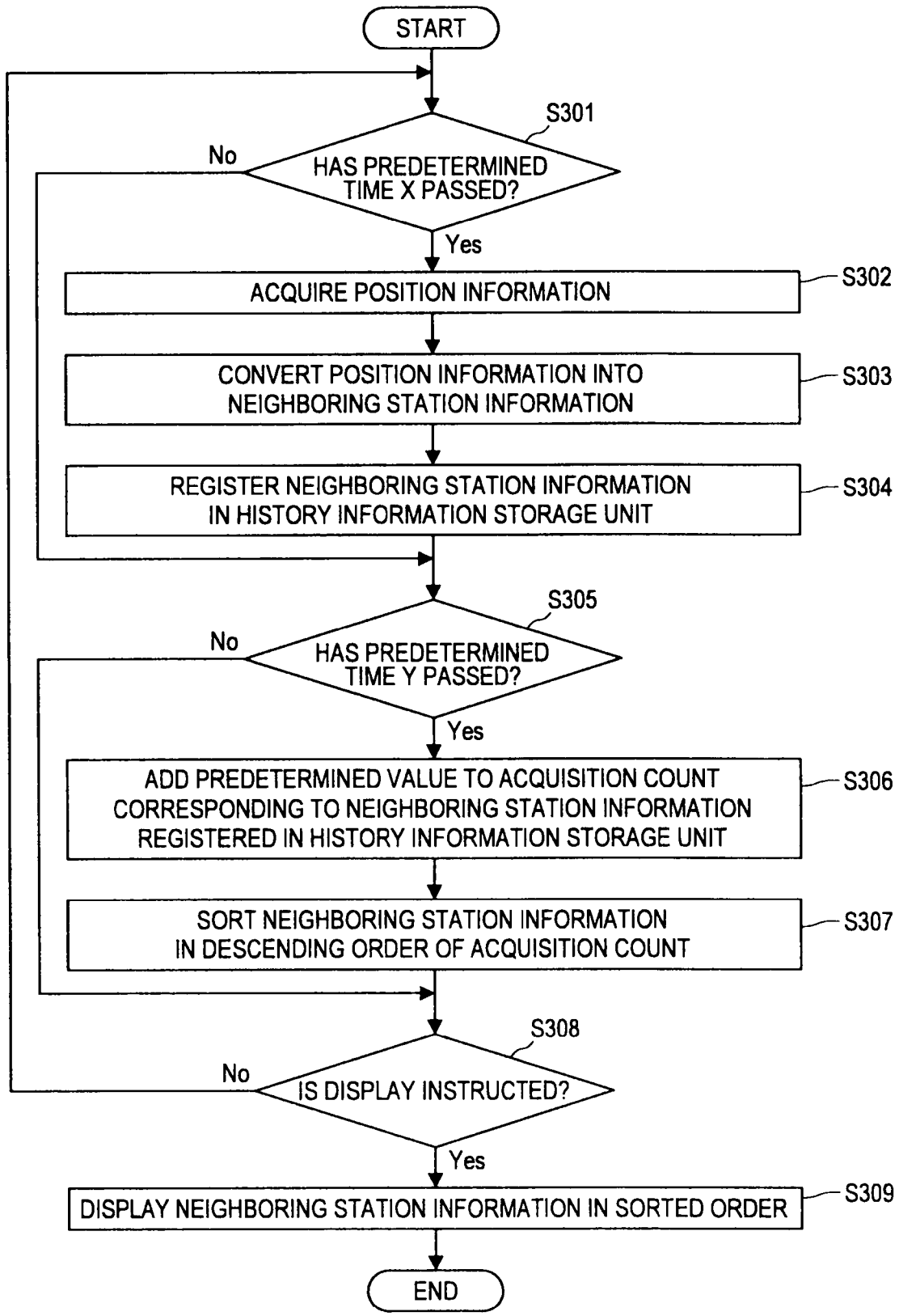
FIG. 8 is a flow chart showing the operation of the information processing apparatus when neighboring station information is used.

Next, the operation of the information processing apparatus when neighboring station information is used will be described. FIG. 8 is a flow chart showing the operation of the information processing apparatus when neighboring station information is used. The operation of the information processing apparatus when neighboring station information is used will be described below using FIG. 8.

As shown in FIG. 8, the acquisition unit 130 determines whether the predetermined time X (for example, one minute) has passed (step S301). If the acquisition unit 130 determines that the predetermined time X has not passed ("No" at step S301), the acquisition unit 130 proceeds to step S305. If the acquisition unit 130 determines that the predetermined time X has passed ("Yes" at step S301), the acquisition unit 130 acquires position information of the local apparatus (step S302), converts the acquired position information into neighboring station information (step S303), and registers the neighboring station information obtained by the conversion in the history information storage unit 170 (step S304).

Subsequently, the acquisition count measuring unit 150 determines whether the predetermined time Y (for example, five minutes) has passed (step S305). If the acquisition count measuring unit 150 determines that the predetermined time Y has not passed ("No" at step S305), the acquisition count measuring unit 150 proceeds to step S308. If the acquisition count measuring unit 150 determines that the predetermined time Y has passed ("Yes" at step S305), the acquisition count measuring unit 150 searches the acquired information storage unit 180 for an acquisition count corresponding to unprocessed neighboring station information registered in the history information storage unit 170 and adds a predetermined value (for example, "1") to the acquisition count (step S306). It is assumed, for example, that a processing complete flag to determine whether processing is completed is attached to each piece of neighboring station information. In that case, a value indicating that neighboring station information is not processed is set to a processing complete flag attached to neighboring station information for which addition is not completed and the acquisition count measuring unit 150 sets a value indicating completion of processing to a processing complete flag attached to neighboring station information for which addition is completed.

Subsequently, the control unit 160 sorts acquired information stored in the acquired information storage unit 180 in descending order of acquisition count (step S307). The control unit 160 determines whether the input unit 120 has accepted input of any display instruction from the user (step S308). If the control unit 160 determines that the input unit 120 has not accepted input of any display instruction from the user ("No" at step S308), the control unit 160 returns to step S301 to continue processing. If the control unit 160 determines that the input unit 120 has accepted input of a display instruction from the user ("Yes" at step S308), the control unit 160 displays the neighboring station information in the sorted order (step S309) before terminating processing.

In the foregoing, the operation of the information processing apparatus 100 when neighboring station information is used has been described. Incidentally, the information processing apparatus 100 may further be provided with the storage unit 190 to store browsing data identification information to identify browsing data displayed in the display unit 140. In that case, the control unit 160 may further cause the display unit 140 to display browsing data identification information stored in the storage unit 190. As an example of the browsing data identification information, an information carrying page name and an information carrying page address will be used below. The information carrying page name will be used as browsing data identification information displayed in the display unit 140 and the information carrying page address will be used as browsing data identification information transmitted to the information management apparatus 200. In this case, for example, the storage unit 190 has information carrying page information in which the information carrying page name and information carrying page address are associated stored therein so that the information carrying page name and information carrying page address are interchangeable. Next, a data structure example of information carrying page information stored in the storage unit 190 of the information processing apparatus 100 according to the first embodiment of the present invention will be described.

[1-9. Data Structure Example of Information Carrying Page Information]

Figures 9, 10:
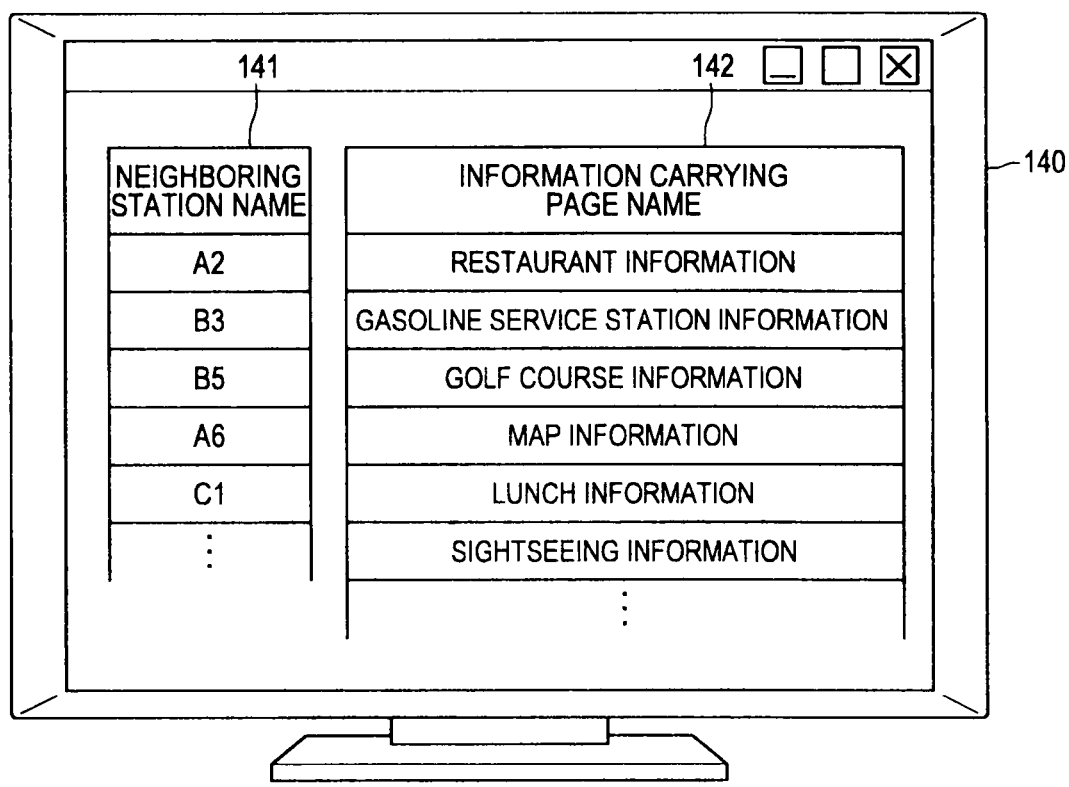
FIG. 9 is a diagram showing a data structure example of information carrying page information stored in the storage unit of the information processing apparatus according to the first embodiment of the present invention.
FIG. 10 is a diagram showing a display example of information displayed by a display unit of the information processing apparatus according to the first embodiment of the present invention.

Next, a data structure example of information carrying page information stored in a storage unit of an information processing apparatus according to the first embodiment of the present invention will be described. FIG. 9 is a diagram showing a data structure example of information carrying page information stored in a storage unit of an information processing apparatus according to the first embodiment of the present invention. A data structure example of information carrying page information stored in a storage unit of an information processing apparatus according to the first embodiment of the present invention will be described below using FIG. 9.

As shown in FIG. 9, information carrying page information has a structure in which the information carrying page name and information carrying page address are associated.

In the foregoing, a data structure example of information carrying page information stored in the storage unit 190 of the information processing apparatus 100 according to the first embodiment of the present invention has been described. Next, a display example of information displayed by the display unit 140 of the information processing apparatus 100 according to the first embodiment of the present invention will be described.

[1-10. Display Example of Information by Display Unit]

Figure 11:
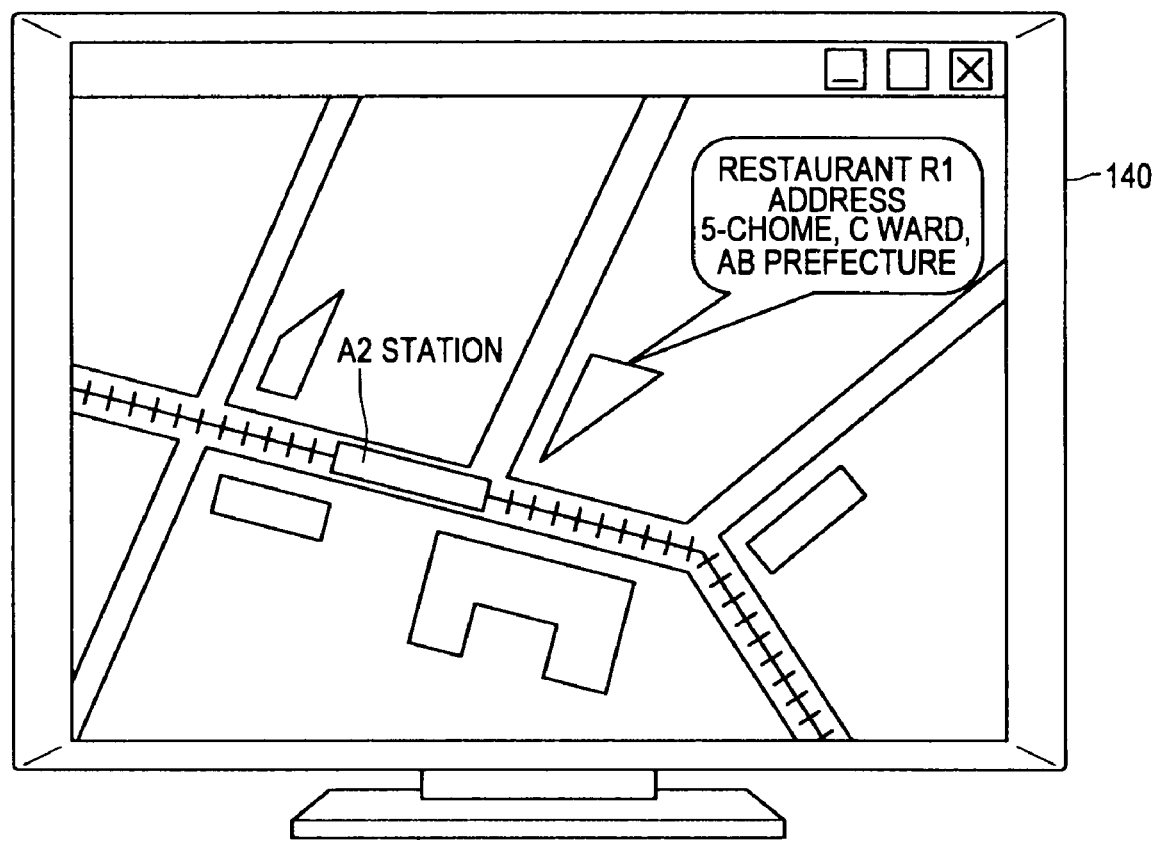
FIG. 11 is a diagram showing a display example of information displayed by a display unit of the information processing apparatus according to the first embodiment of the present invention.

Next, a display example of information displayed by a display unit of an information processing apparatus according to the first embodiment of the present invention will be described. FIGS. 10 and 11 are diagrams showing display examples of information displayed by a display unit of an information processing apparatus according to the first embodiment of the present invention. Display examples of information displayed by a display unit of an information processing apparatus according to the first embodiment of the present invention will be described below using FIGS. 10 and 11.

As shown in FIG. 10, the control unit 160 can cause the display unit 140 to display a neighboring station name 141 and an information carrying page name 142. The neighboring station name 141 is neighboring station information stored in the acquired information storage unit 180 being displayed and, instead of the neighboring station information, address information may be displayed or position information may be displayed. The information carrying page name 142 is an information carrying page name stored in the acquired information storage unit 180 being displayed.

The input unit 120 can accept input of position selection information to select one piece of position information (for example, the neighboring station name 141) displayed in the display unit 140 and browsing data selection information to select one piece of browsing data identification information (for example, the information carrying page name 142) displayed in the display unit 140. When the input unit 120 accepts input of position selection information and browsing data selection information, the control unit 160 acquires browsing data identified by browsing data identification information (for example, the information carrying page name 142) selected based on the browsing data selection information and related to position information (for example, the neighboring station name 141) selected based on the position selection information from another apparatus and causes the display unit 140 to display the browsing data. For example, the control unit 160 can acquire browsing data as an example of the browsing data from the information management apparatus 200 as an example of another apparatus through the network 300 via the communication unit 110.

Browsing data related to position information (for example, the neighboring station name 141) may be, for example, browsing data containing the position information or browsing data to which the browsing data is attached.

FIG. 11 shows a display example when the display unit 140 is caused to display browsing data acquired by the control unit 160. FIG. 11 shows an example in which the control unit 160 causes the display unit 140 to display browsing data when "A2" is selected as an example of the position information (for example, the neighboring station name 141) and "Restaurant information" is selected as an example of the browsing data identification information (for example, the information carrying page name 142).

In the foregoing, display examples of information displayed by the display unit 140 of the information processing apparatus 100 according to the first embodiment of the present invention have been described. According to the configuration described above, the user of the information processing apparatus 100 can grasp frequently visited places. The user of the information processing apparatus 100 can also browse information about frequently visited places by selecting, in the above example, browsing data identification information (for example, the information carrying page name 142) and position information (for example, the neighboring station name 141).

The storage unit 190 may further store time zone conditions indicating conditions for the date, day of week or time associated with browsing data identification information. In that case, the control unit 160 is assumed to acquire the current date, day of week or time as current information, determine whether the acquired current information satisfies time zone conditions and, if it is determined that the time zone conditions are satisfied, cause the display unit 140 to display browsing data identification information associated with the time zone conditions. Next, information carrying page information when time zone conditions are used will be described.

[1-11. Data Structure Example of Information Carrying Page Information when Time Zone Conditions are Used]

Next, a data structure example of information carrying page information when time zone conditions are used will be described. FIG. 12 is a diagram showing a data structure example of information carrying page information when time zone conditions are used. A data structure example of information carrying page information when time zone conditions are used will be described below.

As shown in FIG. 12, information carrying page information has a structure in which the information carrying page name, information carrying page address, and time zone conditions are associated.

In the foregoing, a data structure example of information carrying page information when time zone conditions are used has been described. Next, a display example of information carrying page information when time zone conditions are used will be described.

[1-12. Display Example of Information Carrying Page Information when Time Zone Conditions are Used]

Next, a display example of information carrying page information when time zone conditions are used will be described. FIG. 13 is a diagram showing a display example of information carrying page information when time zone conditions are used. A display example of information carrying page information when time zone conditions are used will be described below using FIG. 13.

As shown in FIG. 13, the control unit 160 can cause the display unit 140 to display the neighboring station name 141 and the information carrying page name 142. FIG. 13 shows an example displayed at "As of 19:00, Dec. 12 (Fri), 2008" and, among time zone conditions shown in FIG. 12, "Holiday event information", "Bar information" and the like satisfying the current day of week/time conditions are also displayed.

In the foregoing, a display example of information carrying page information when time zone conditions are used has been described. The storage unit 190 may store browsing data identification information (for example, the information carrying page name 142) to identify browsing data displayed in the display unit 140 to associate and store route information indicating a route and station information indicating stations on a route. In that case, the control unit 160 sorts neighboring station information of acquired information stored in the acquired information storage unit 180 in descending order of acquisition count stored in the storage unit 190 by being associated with the neighboring station information and causes the display unit 140 to display the neighboring station information. At the same time, the control unit 160 acquires station information that is associated with route information in which neighboring station information is present and is other than the neighboring station information from the storage unit 190 and causes the display unit 140 to display the station information. Next, a data structure example of correspondence information between route information and station information will be described.

[1-13. Data Structure Example of Correspondence Information Between Route Information and Station Information]

Next, a data structure example of correspondence information between route information and station information will be described. FIG. 14 is a diagram showing a data structure example of correspondence information between route information and station information. A data structure example of correspondence information between route information and station information will be described below.

As shown in FIG. 14, correspondence information between route information and station information has a structure in which the route name as an example of the route information and the station name as an example of the station information are associated.

In the foregoing, a data structure example of correspondence information between route information and station information has been described. Next, a display example of correspondence information between route information and station information will be described below.

[1-14. Display Example of Correspondence Information Between Route Information and Station Information]

Next, a display example of correspondence information between route information and station information will be described. FIG. 15 is a diagram showing a display example of correspondence information between route information and station information. A display example of correspondence information between route information and station information will be described below using FIG. 15.

As shown in FIG. 15, station names 144 associated with route information in which neighboring station names are present are displayed in the display unit 140. A route name 143 as an example of the route information may also be displayed in the display unit 140.

In the foregoing, a display example of correspondence information between route information and station information has been described. The storage unit 190 may further store the search keyword indicating a term specified as a key when a search is performed by the control unit 160. In that case, the control unit 160 further causes the display unit 140 to display search keywords stored in the storage unit 190. The input unit 120 further accepts input of search keyword selection information to select one of search keywords displayed in the display unit 140. When the input unit 120 further accepts input of search keyword selection information, the control unit 160 acquires browsing data identified by browsing data identification information (for example, the information carrying page name 142) selected based on browsing data selection information, related to position information (for example, the neighboring station name 141) selected based on position selection information, and a search keyword selected based on the search keyword selection information from another apparatus and causes the display unit 140 to display the browsing data.

Browsing data related to a search keyword may be, for example, browsing data containing the search keyword or browsing data to which the search keyword is attached.

The storage unit 190 may further store the search count indicating the number of times of searching by being associated with a search keyword and using the search keyword as a search key. In that case, for example, the control unit 160 may further cause the display unit 140 to display only search keywords corresponding to search counts exceeding a threshold stored in the storage unit 190. Next, a data structure example of correspondence information between the search keyword and search count will be described.

[1-15. Data Structure Example of Correspondence Information Between Search Keyword and Search Count]

Figures 16, 17:
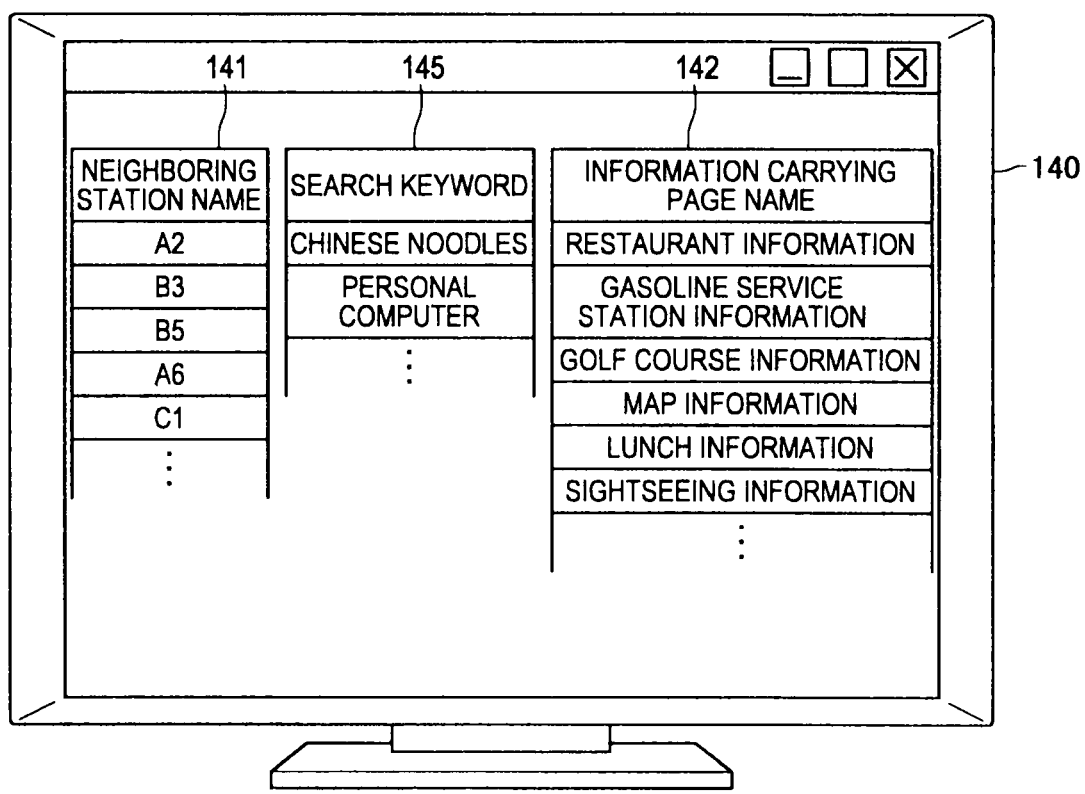
FIG. 16 is a diagram showing a data structure example of correspondence information between a search keyword and search count.
FIG. 17 is a diagram showing a display example of the search keyword.

Next, a data structure example of correspondence information between the search keyword and search count will be described. FIG. 16 is a diagram showing a data structure example of correspondence information between the search keyword and search count. A data structure example of correspondence information between the search keyword and search count will be described below.

As shown in FIG. 16, correspondence information between the search keyword and search count has a structure in which the search keyword and the search count are associated.

In the foregoing, a data structure example of correspondence information between the search keyword and search count has been described. Next, a display example of correspondence information between the search keyword and search count will be described.

[1-16. Display Example of Search Keyword]

Next, a display example of the search keyword will be described. FIG. 17 is a diagram showing a display example of the search keyword. A display example of the search keyword will be described below using FIG. 17.

As shown in FIG. 17, in addition to the neighboring station name 141 and the information carrying page name 142, a search keyword 145 may be displayed in the display unit 140.

In the foregoing, a display example of the search keyword has been described. The storage unit 190 may also store group identification information to identify the belonging group of a user. In that case, the control unit 160 further causes the display unit 140 to display group identification data stored in the storage unit 190. The input unit 120 accepts input of position selection information to select one piece of position information displayed in the display unit 140 and group selection information to select one piece of group identification data displayed in the display unit 140. When the input unit 120 accepts input of position selection information and group selection information, the control unit 160 acquires browsing data related to group identification data selected based on the group selection information and related to position information selected based on the position selection information from another apparatus and causes the display unit 140 to display the browsing data.

Browsing data related to group identification data may be, for example, browsing data containing the group identification data or browsing data to which the group identification data is attached. Next, a data structure example of group identification data will be described.

[1-17. Data Structure Example of Group Identification Data]

Next, a data structure example of group identification data will be described. FIG. 18 is a diagram showing a data structure example of group identification data. A data structure example of group identification data will be described below.

As shown in FIG. 18, group identification data has a structure in which the belonging group is set as an example.

In the foregoing, a data structure example of group identification data has been described. Next, a display example of group identification data will be described.

[1-18. Display Example of Group Identification Data]

Next, a display example of group identification data will be described. FIG. 19 is a diagram showing a display example of the group identification data. A display example of group identification data will be described below using FIG. 19.

As shown in FIG. 19, in addition to the neighboring station name 141, a belonging group 146 as an example of the group identification data may be displayed in the display unit 140.

In the foregoing, a display example of group identification data has been described. The storage unit 190 may also store content data. Content data includes music data such as music, lectures, and radio programs, video data such as movies, TV programs, video programs, photos, pictures, and charts, and any kind of data such as games and software. In that case, when the reproduction unit 191 reproduces content data stored in the storage unit 190, the reproduction unit 191 acquires terms related to the content data from the reproduced content data and causes the storage unit 190 to store the terms as related keywords.

The control unit 160 further causes the display unit 140 to display related keywords stored in the storage unit 190 and the input unit 120 accepts input of position selection information to select one piece of position information displayed in the display unit 140 and related keyword selection information to select one of related keywords displayed in the display unit 140. When the input unit 120 accepts input of position selection information and related keyword selection information, the control unit 160 acquires browsing data related to the related keyword selected based on the related keyword selection information and related to position information selected based on the position selection information from another apparatus and causes the display unit 140 to display the browsing data.

Browsing data related to the related keyword may be, for example, browsing data containing the related keyword or browsing data to which the related keyword is attached. If content data is news program data, the reproduction unit 191 can acquire a viewing news genre from the news program data to cause the storage unit 190 to store the genre as an example of the related keyword.

The storage unit 190 may further store the reproduction count of content data by being associated with a related keyword. In that case, for example, the control unit 160 may further cause the display unit 140 to display only related keywords corresponding to reproduction counts exceeding a threshold stored in the storage unit 190. Next, a data structure example of correspondence information between the related keyword and reproduction count will be described.

[1-19. Data Structure Example of Correspondence Information Between Related Keyword and Reproduction Count]

Figures 20, 21:
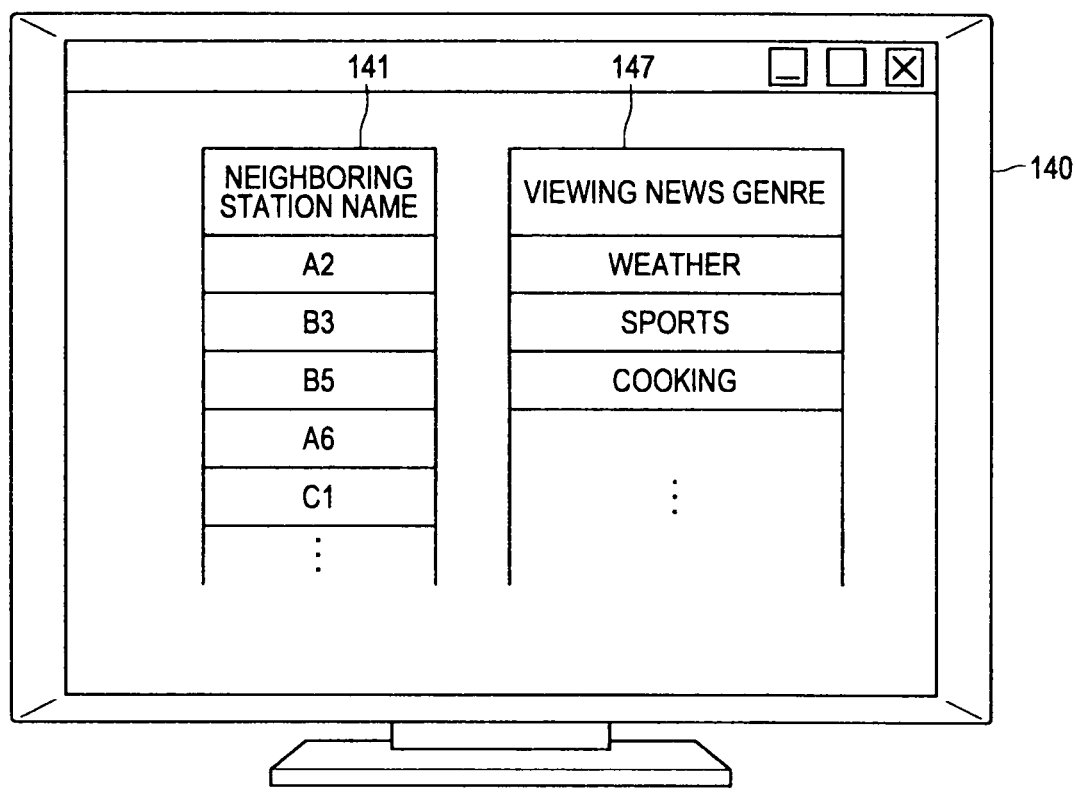
FIG. 20 is a diagram showing a data structure example of correspondence information between a related keyword and the reproduction count.
FIG. 21 is a diagram showing a display example of the related keyword.

Next, a data structure example of correspondence information between the related keyword and reproduction count will be described. FIG. 20 is a diagram showing a data structure example of correspondence information between the related keyword and reproduction count. A data structure example of correspondence information between the related keyword and reproduction count will be described below.

As shown in FIG. 20, correspondence information between the related keyword and reproduction count has a structure in which the viewing news genre as an example of the related keyword and the viewing count as an example of the reproduction count are associated.

In the foregoing, a data structure example of correspondence information between the related keyword and reproduction count has been described. Next, a display example of the related keyword will be described.

[1-20. Display Example of Related Keyword]

Next, a display example of the related keyword will be described. FIG. 21 is a diagram showing a display example of the related keyword. A display example of the related keyword will be described below using FIG. 21.

As shown in FIG. 21, in addition to the neighboring station name 141, a viewing news genre 147 as an example of the related keyword may be displayed in the display unit 140.

In the foregoing, a display example of the related keyword has been described. The storage unit 190 may store application data as well as browsing data identification information to identify browsing data displayed in the display unit 140. Further, the storage unit 190 may associate and store application data identification information to identify application data, the activation count indicating the number of times that the application data is activated, and position information.

In that case, when application data stored in the storage unit 190 is activated by the control unit 160, the activation count measuring unit 192 adds a predetermined value to the activation count associated with position information indicating the position of the local apparatus during activation of the application acquired by the acquisition unit 130 and application data identification information corresponding to the activated application data.

The control unit 160 further causes the display unit 140 to display browsing data identification information in accordance with the application data identification information corresponding to the position information indicating the current position acquired by the acquisition unit 130 and the activation count. The input unit 120 accepts input of position selection information to select one piece of position information displayed in the display unit 140 and browsing data selection information to select one piece of browsing data identification information displayed in the display unit 140. When the input unit 120 accepts input of position selection information and browsing data selection information, the control unit 160 acquires browsing data related to browsing data identification information selected based on the browsing data selection information and position information selected based on the position selection information from another apparatus and causes the display unit 140 to display the browsing data.

If the storage unit 190 associates and stores application data identification information, browsing data identification information, and the range of activation count and the activation count of the application corresponding to the application data identification information is within the range of the activation count thereof, browsing data identification information in accordance with application data identification information and activation count is assumed to be browsing data identification information corresponding to the range of the activation count thereof. Next, a data structure example of correspondence information between position information and the activation count of an application P when the application P is assumed to be stored in the storage unit 190 will be described.

[1-21. Data Structure Example of Correspondence Information Between Position Information and Activation Count of Application]

Next, a data structure example of correspondence information between position information and the activation count of application will be described. FIG. 22 is a diagram showing a data structure example of correspondence information between position information and the activation count of application. A data structure example of correspondence information between position information and the activation count of application will be described below.

As shown in FIG. 22, correspondence information between position information and the activation count of the application P has a structure in which the neighboring station name as an example of the position information and the application P are associated.

In the foregoing, correspondence information between position information and the activation count of the application P has been described. Next, a data structure of correspondence information between the range of activation count of the application P and browsing data identification information will be described.

[1-22. Data Structure of Correspondence Information Between Range of Activation Count of Application and Browsing Data Identification Information]

Next, a data structure example of correspondence information between the range of activation count of application and browsing data identification information will be described. FIG. 23 is a diagram showing a data structure example of correspondence information between the range of activation count of application and browsing data identification information. A data structure example of correspondence information between the range of activation count of application and browsing data identification information will be described below.

As shown in FIG. 22, correspondence information between the activation count of the application P and browsing data identification information has a structure in which the activation count of the application P as an example of the range of activation count of the application P and the information carrying page name as an example of the browsing data identification information.

In the foregoing, correspondence information between the range of the activation count of the application P and browsing data identification information has been described. Next, a display example of browsing data identification information when the activation count of application is used will be described.

[1-23. Display Example of Browsing Data Identification Information when Activation Count of Application is Used]

Figures 24, 25:
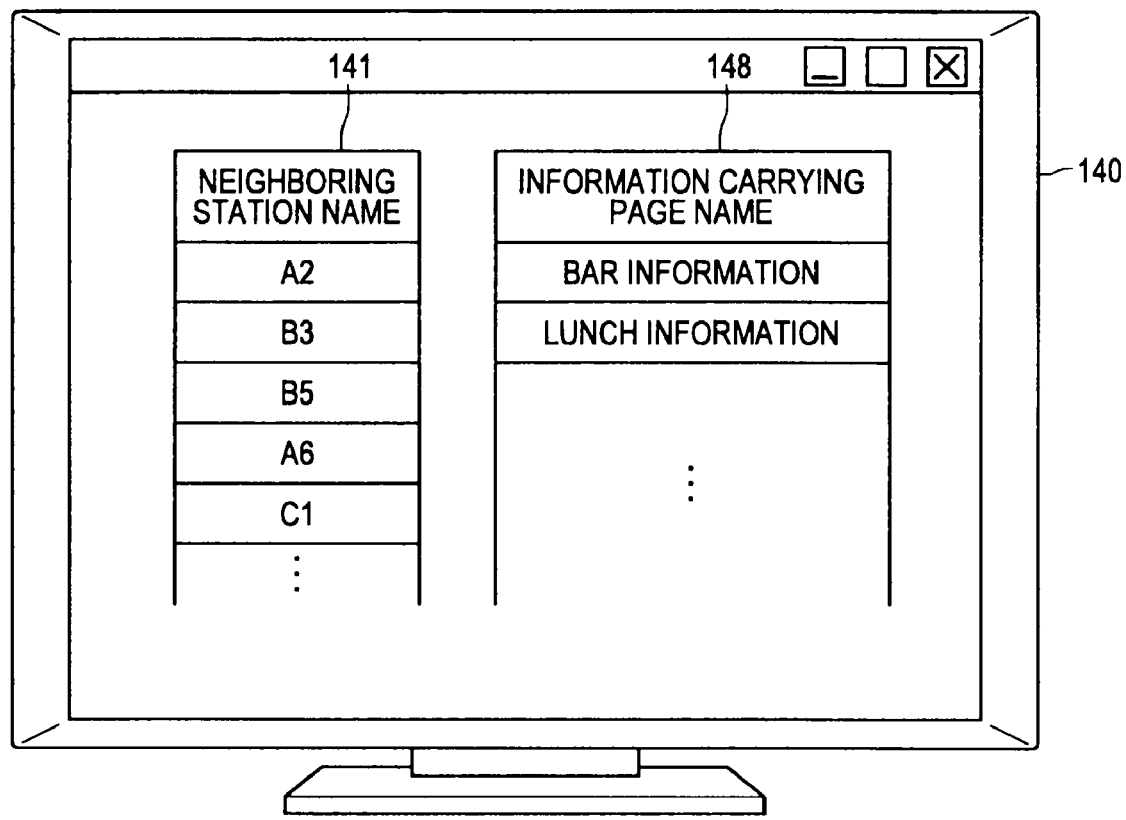
FIG. 24 is a diagram showing a display example of browsing data identification information when the activation count of application is used.
FIG. 25 is a diagram showing a data structure example of correspondence information between position information and the reproduction count of content data.

Next, a display example of browsing data identification information when the activation count of application is used will be described. FIG. 24 is a diagram showing a display example of browsing data identification information when the activation count of application is used. A display example of browsing data identification information when the activation count of application is used will be described below using FIG. 24.

As shown in FIG. 24, in addition to the neighboring station name 141, an information carrying page name 148 as an example of the browsing data identification information is displayed. FIG. 24 shows an example displayed in the display unit 140 when the user of the information processing apparatus 100 is present at the position indicated by the neighboring station name "A2". In this case, the activation count of the application P for the neighboring station name "A2" is "124 times" (see FIG. 22), which corresponds to "100 times or more" (see FIG. 23). Thus, information carrying page names "Bar information" and "Lunch information" corresponding to "100 times or more" are displayed as information carrying page names 148.

In the foregoing, a display example of browsing data identification information when the activation count of application is used has been described. The storage unit 190 may store content data as well as browsing data identification information to identify browsing data displayed in the display unit 140. In that case, the storage unit 190 may associate and store content data identification information to identify content data and content analysis results obtained by analyzing the content data and also content identification information, the reproduction count indicating the number of times of reproducing content data, and position information.

When the reproduction unit 191 reproduces content data stored in the storage unit 190, the reproduction unit 191 adds a predetermined value to the reproduction count associated with position information indicating the position of the local apparatus during reproduction of content data acquired by the acquisition unit 130 and content data identification information corresponding to the reproduced content data.

The control unit 160 further causes the display unit 140 to display browsing data identification information in accordance with content analysis results corresponding to the content data identification information corresponding to the position information indicating the current position acquired by the acquisition unit 130 and the reproduction count. The input unit 120 accepts input of position selection information to select one piece of position information displayed in the display unit 140 and browsing data selection information to select one piece of browsing data identification information displayed in the display unit 140. When the input unit 120 accepts input of position selection information and browsing data selection information, the control unit 160 acquires browsing data related to browsing data identification information selected based on the browsing data selection information and position information selected based on the position selection information from another apparatus and causes the display unit 140 to display the browsing data. Next, a data structure example of correspondence information between position information and reproduction counts of content data S and T when the content data S and T is assumed to be stored in the storage unit 190.

Browsing data identification information in accordance with content analysis results and the reproduction count is stored in, for example, the storage unit 190 by associating content analysis results, browsing data identification information, and the range of reproduction count. If the reproduction count of content data corresponding to content analysis results is within the range of reproduction count thereof, the browsing data identification information is assumed to be browsing data identification information corresponding to the range of the reproduction count. Next, a data structure example of correspondence information between position information and reproduction counts of content data S and T when the content data S and T is assumed to be stored in the storage unit 190.

[1-24. Data Structure Example of Correspondence Information Between Position Information and Reproduction Count of Content Data]

Next, a data structure example of correspondence information between position information and the reproduction count of content data will be described. FIG. 25 is a diagram showing a data structure example of correspondence information between position information and the reproduction count of content data. A data structure example of correspondence information between position information and the reproduction count of content data will be described below.

As shown in FIG. 25, correspondence information between position information and reproduction counts of the content data S and T has a structure in which the neighboring station name as an example of the position information, the reproduction count of the content data S, and the reproduction count of the content data T are associated. Here, two pieces of content data S and T are stored in the storage unit 190, but the number of pieces of content data is not specifically limited if there is at least one piece of content data.

In the foregoing, correspondence information between position information and reproduction counts of the content data S and T has been described. Next, a data structure of correspondence information between content data identification information and content data analysis results will be described.

[1-25. Data Structure of Correspondence Information Between Content Data Identification Information and Content Data Analysis Results]

Next, a data structure example of correspondence information between content data identification information and content data analysis results will be described. FIG. 26 is a diagram showing a data structure example of correspondence information between content data identification information and content data analysis results. A data structure example of correspondence information between content data identification information and content data analysis results will be described below.

As shown in FIG. 26, correspondence information between content data identification information and content data analysis results has a structure in which the content data name as an example of the content data identification information and the content data analysis results are associated.

In the foregoing, correspondence information between content data identification information and content data analysis results has been described. Next, a data structure of correspondence information among content data analysis results, the range of reproduction count of content data, and browsing data identification information will be described.

[1-26. Data Structure of Correspondence Information Among Content Data Analysis Results, Range of Reproduction Count of Content Data, and Browsing Data Identification Information]

Next, a data structure example of correspondence information among content data analysis results, the range of reproduction count of content data, and browsing data identification information will be described. FIG. 27 is a diagram showing a data structure example of correspondence information among content data analysis results, the range of reproduction count of content data, and browsing data identification information. A data structure example of correspondence information among content data analysis results, the range of reproduction count of content data, and browsing data identification information will be described below.

As shown in FIG. 27, correspondence information among content data analysis results, the range of reproduction count of content data, and browsing data identification information has a structure in which content data analysis results, the reproduction count as an example of the range of reproduction count of content data, and the information carrying page name as an example of the browsing data identification information are associated. Next, a display example of browsing data identification information when content data analysis results are used will be described.

[1-27. Display Example of Browsing Data Identification Information when Content Data Analysis Results are Used]

Figure 28:
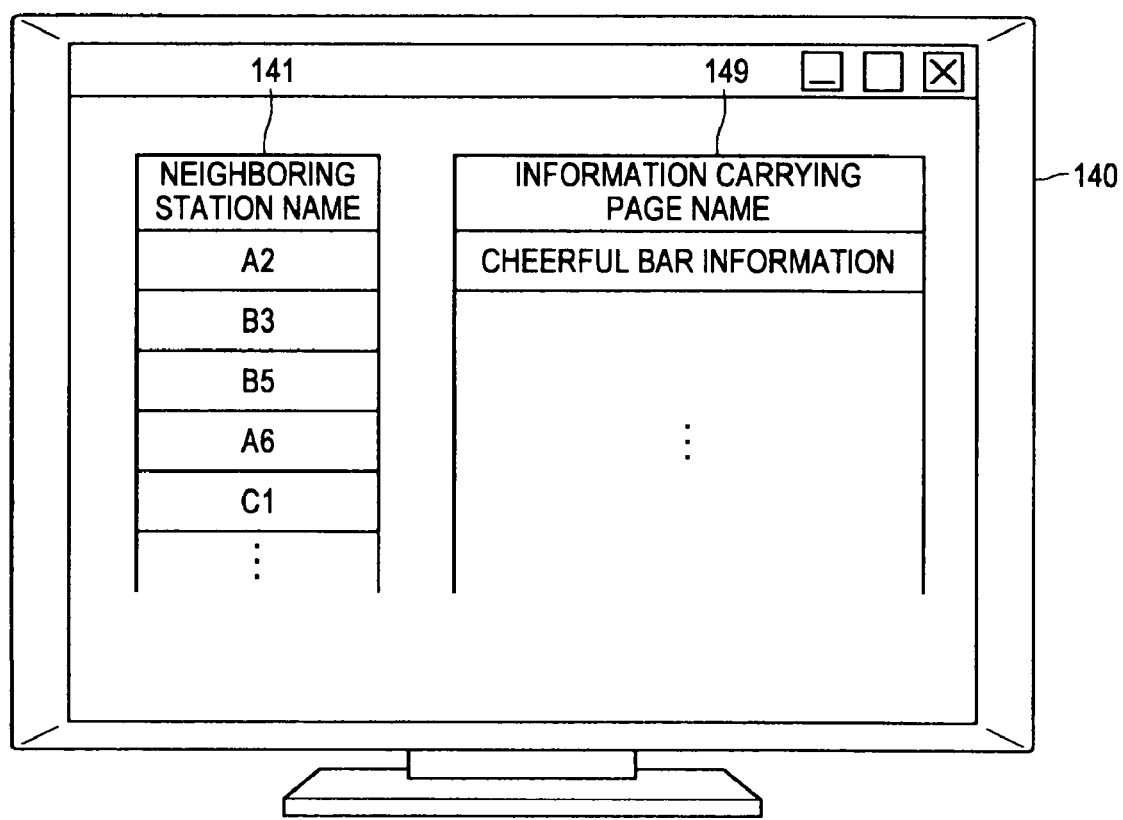
FIG. 28 is a diagram showing a display example of browsing data identification information when content data analysis results are used.

Next, a display example of browsing data identification information when content data analysis results are used will be described. FIG. 28 is a diagram showing a display example of browsing data identification information when content data analysis results are used. A display example of browsing data identification information when content data analysis results are used will be described below using FIG. 28.

As shown in FIG. 28, in addition to the neighboring station name 141, an information carrying page name 149 as an example of the browsing data identification information is displayed. FIG. 28 shows an example displayed in the display unit 140 when the user of the information processing apparatus 100 is present at the position indicated by the neighboring station name "A2". In this case, the reproduction count of content data S for the neighboring station name "A2" is "112 times" (see FIG. 25) and analysis results of the content data S are "cheerful". The reproduction count "112 times" of content data S corresponds to the reproduction count "100 times or more" corresponding to the analysis results "cheerful" of the content data S (see FIG. 27). Thus, an information carrying page name "Cheerful bar information" corresponding to "100 times or more" is displayed as information carrying page name 149.

In the foregoing, a display example of browsing data identification information when content data analysis results are used has been described.

2. Summary

According to an information processing apparatus according to an embodiment of the present invention, as described above, a user of the information processing apparatus can grasp frequently visited places. The user of the information processing apparatus can also browse information about frequently visited places by selecting browsing data identification information and position information.

3. Modification of the Present Embodiment

It should be understood by those skilled in the art that various modifications, combinations, sub-combinations and alterations may occur depending on design requirements and other factors insofar as they are within the scope of the appended claims or the equivalents thereof.

In the present embodiment, an example of the configuration in which an information processing apparatus and an information management apparatus are separated is described, but the present embodiment is not limited to such an example and the information processing apparatus and the information management apparatus may be integrally configured.

Each step in processing of an information processing apparatus herein does not necessarily have to be executed chronologically along the order described as a flow chart or sequence diagram and processing performed in parallel or individually (for example, parallel processing or processing by an object) may also be contained.

In the present embodiment, an example in which a control unit of an information processing apparatus causes a display unit to display route information of trains is described, but the present embodiment is not limited to such an example and the display unit can be caused to display information about routes used by all forms of transportation. The control unit of the information processing apparatus can cause the display unit to display information about, for example, principal roads such as national roads, prefectural roads, and superhighways. When a user of the information processing apparatus goes overseas, the control unit of the information processing apparatus can cause the display unit to display recommended information about a foreign country the user visits.

The control unit of the information processing apparatus can also display recommended places based on position information showing the current position and weather information of recommended places. If, for example, weather information of the current position is rainy, the control unit of the information processing apparatus can cause the display unit to display information to recommend fine, scenic spots. If the user of the information processing apparatus is listening to somber music, the control unit of the information processing apparatus can cause the display unit to display information to recommend fine spots.

The present application contains subject matter related to that disclosed in Japanese Priority Patent Application JP 2008-335253 filed in the Japan Patent Office on 26 Dec. 2008, the entire content of which is hereby incorporated by reference.

What is claimed is:

1. An information processing apparatus, comprising:
   at least one memory that stores acquired information that associates mutually different position information and an acquisition count of the position information, the acquisition count being a value corresponding to a frequency in which the position information is acquired;
   an acquisition unit that acquires the position information indicating a position of a local apparatus;
   at least one processor that, when the acquisition unit acquires the position information, adds a predetermined value to the acquisition count based on the acquired position information, and the stored position information corresponding to the acquisition count, and that sorts the acquired information stored in the at least one memory in descending order of the acquisition count.

2. The information processing apparatus according to claim 1, further comprising:
a display unit,
wherein the at least one processor causes the display unit to display the position information of the acquired information stored in the at least one memory in the sorted order.

3. The information processing apparatus according to claim 2, wherein
the at least one memory further stores browsing data identification information to identify browsing data displayed in the display unit, and wherein
the at least one processor further causes the display unit to display the browsing data identification information stored in the at least one memory.

4. The information processing apparatus according to claim 3, further comprising:
an input unit,
wherein the at least one processor, when the input unit accepts input of position selection information to select one piece of the position information displayed in the display unit and browsing data selection information to select one piece of the browsing data identification information displayed in the display unit, acquires the browsing data identified by the browsing data identification information selected based on the browsing data selection information and related to the position information selected based on the position selection information from another apparatus and causes the display unit to display the browsing data.

5. The information processing apparatus according to claim 3, wherein
the at least one memory further stores time zone conditions indicating conditions for a date, a day of week or a time associated with the browsing data identification information, and
the at least one processor acquires a current date, day of week or time as current information, determines whether the acquired current information satisfies the time zone conditions and, if the time zone conditions are satisfied, causes the display unit to display the browsing data identification information associated with the time zone conditions.

6. The information processing apparatus according to claim 3, wherein
the at least one memory further stores a search keyword indicating a term specified as a key when a search is performed by at least one processor, and
the at least one processor causes the display unit to display the search keywords stored in the at least one memory and, when the input unit further accepts input of search keyword selection information to select one of the search keywords displayed in the display unit, acquires the browsing data identified by the browsing data identification information selected based on the browsing data selection information, related to the position information selected based on the position selection information, and related to the search keyword selected based on the search keyword selection information from another apparatus and causes the display unit to display the browsing data.

7. The information processing apparatus according to claim 2, further comprising:
an input unit,
wherein
the at least one memory further stores group identification data to identify a belonging group of a user, and
the at least one processor causes the display unit to display the group identification data stored in the at least one memory and, when the input unit accepts input of position selection information to select one piece of the position information displayed in the display unit and group selection information to select one piece of the group identification data displayed in the display unit, acquires the browsing data related to the group identification data selected based on the group selection information and related to the position information selected based on the position selection information from another apparatus and causes the display unit to display the browsing data.

8. The information processing apparatus according to claim 2, further comprising:
an input unit,
wherein
the at least one memory further stores content data; and
the at least one processor, when the content data stored in the at least one memory is reproduced, acquires information about the reproduced content data and causes the at least one memory to store the information as related information, and the at least one processor causes the display unit to display the related information stored in the at least one memory and, when the input unit accepts input of position selection information to select one piece of the position information displayed in the display unit and related information selection information to select the related information displayed in the display unit, acquires the browsing data related to the related information selected based on the related information selection information and related to the position information selected based on the position selection information from another apparatus and causes the display unit to display the browsing data.

9. The information processing apparatus according to claim 2, further comprising:
an input unit,
wherein
the at least one memory further stores application data as well as browsing data identification information to identify browsing data displayed in the display unit and associates application data identification information to identify the application data, an activation count indicating a number of times of activating the application data, and position information for storage, and
the at least one processor, when the application data stored in the at least one memory is activated by the at least one processor, adds a predetermined value to the activation count associated with the position information indicating the position of the local apparatus during activation of the application acquired by the acquisition unit and the application data identification information corresponding to the activated application data, and the at least one processor further causes the display unit to display the browsing data identification information in accordance with the application data identification information corresponding to the position information indicating the current position acquired by the acquisition unit and the activation count and, when the input unit accepts input of position selection information to select one piece of the position information displayed in the display unit and browsing data selection information to select one piece of the browsing data identification information displayed in the display unit, acquires the browsing data related to the browsing data identification information selected based on the browsing data selection information and related to the position information selected based on the position selection information from another apparatus and causes the display unit to display the browsing data.

10. The information processing apparatus according to claim 2, further comprising:
an input unit,
wherein
the at least one memory further stores content data as well as browsing data identification information to identify browsing data displayed in the display unit, associates content data identification information to identify the content data and content analysis results obtained by analyzing the content data for storage, and associates the content data identification information, a reproduction count indicating a number of times of reproducing the content data, and position information for storage,
the at least one processor, when the content data stored in the at least one memory is reproduced, adds a predetermined value to the reproduction count associated with the position information indicating the position of the local apparatus during reproduction of the content data acquired by the acquisition unit and the content data identification information corresponding to the reproduced content data, and
the at least one processor further causes the display unit to display the browsing data identification information in accordance with the content analysis results corresponding to the content data identification information corresponding to the position information indicating the current position acquired by the acquisition unit and the reproduction count and, when the input unit accepts input of position selection information to select one piece of the position information displayed in the display unit and browsing data selection information to select one piece of the browsing data identification information displayed in the display unit, acquires the browsing data related to the browsing data identification information selected based on the browsing data selection information and related to the position information selected based on the position selection information from another apparatus and causes the display unit to display the browsing data.

11. The information processing apparatus according to claim 1, wherein
the at least one memory stores address information as the position information, and
the at least one processor converts, when the acquisition unit acquires the position information, the acquired position information into address information and adds a predetermined value to the acquisition count based on the acquired address information and the stored address information corresponding to the acquisition count.

12. The information processing apparatus according to claim 1, wherein
the at least one memory stores neighboring station information as the position information, and
the at least one processor converts, when the acquisition unit acquires the position information, the acquired position information into neighboring station information indicating a neighboring station present near the position information and adds a predetermined value to the acquisition count based on the acquired neighboring station information and the stored neighboring station information corresponding to the acquisition count.

13. The information processing apparatus according to claim 12, further comprising:
a display unit,
wherein
the at least one memory further stores browsing data identification information to identify browsing data displayed in the display unit and associates route information indicating a route and station information indicating a station present on the route for storage, and
the at least one processor causes the display unit to display the neighboring station information of the acquired information stored in the at least one memory after being sorted in descending order of the acquisition count associated with the neighboring station information and acquires the station information that is associated with the route information in which the neighboring station information is present and is not the neighboring station information from the at least one memory to cause the display unit to display the station information.

14. An information processing apparatus according to claim 1, wherein the at least one processor stores acquired information that associates mutually different position information and an acquisition count of the position information, when a predetermined time X has passed.

15. An information processing apparatus according to claim 1, wherein the at least one processor adds the predetermined value to the acquisition count when a predetermined time Y has passed.

16. An information processing apparatus according to claim 1, wherein the at least one processor adds the predetermined value to the acquisition count based on a distance between the acquired position information and the stored position information corresponding to the acquisition count.

17. An information processing method for an information processing apparatus having a memory that stores acquired information that associates mutually different position information and an acquisition count of position information, the acquisition count being a value corresponding to a frequency in which the position information is acquired; an acquisition unit; and at least one processor, the method comprising:
acquiring position information indicating a position of a local apparatus by the acquisition unit,
adding a predetermined value to the acquisition count based on the acquired position information and the stored position information corresponding to the acquisition count by the at least one processor; and
sorting the acquired information stored in the at least one memory in descending order of the acquisition count by the at least one processor.

18. A non-transitory computer readable medium comprising program code which, when executed by a computer causes the computer to execute instructions, comprising:
storing acquired information that associates mutually different position information and an acquisition count of the position information, the acquisition count being a value of a frequency in which the position information is acquired;
acquiring the position information indicating a position of a local apparatus;
adding, when the acquisition unit acquires the position information, a predetermined value to the acquisition count based on the acquired position information and the stored position information corresponding to the acquisition count; and
sorting the acquired information stored in the at least one memory in descending order of the acquisition count.

* * * * *